(12) United States Patent
Sato et al.

(10) Patent No.: US 6,634,270 B2
(45) Date of Patent: Oct. 21, 2003

(54) SLITTER FOR AN ELECTRODE RAW MATERIAL SHEET AND THE SLITTING PROCESS

(75) Inventors: Takaya Sato, Chiba (JP); Tatsuo Shimizu, Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/907,441

(22) Filed: Jul. 18, 2001

(65) Prior Publication Data

US 2002/0035903 A1 Mar. 28, 2002

(30) Foreign Application Priority Data

Jul. 18, 2000  (JP) .......................................... 2000-217765

(51) Int. Cl.$^7$ ............................................... B26D 07/06
(52) U.S. Cl. .............................. 83/407; 83/425; 83/948; 83/949
(58) Field of Search ........................... 83/23, 101, 102, 83/107, 168, 407, 425, 948, 949, 649

(56) References Cited

U.S. PATENT DOCUMENTS

| | | | | |
|---|---|---|---|---|
| 2,194,570 A | * | 3/1940 | Schafer et al. ............... 264/138 |
| 3,871,253 A | * | 3/1975 | Pryce et al. ................... 83/881 |
| 4,643,058 A | * | 2/1987 | Zingler et al. .................. 83/23 |
| 4,991,482 A | * | 2/1991 | D'Angelo et al. ............. 83/874 |

* cited by examiner

*Primary Examiner*—Paul T. Sewell
*Assistant Examiner*—M. Chambers
(74) *Attorney, Agent, or Firm*—Apex Juris, PLLC; Tracy M. Heims

(57) ABSTRACT

An electrode with an excellent quality for an electrical component, wherein an electrode raw material sheet slitter includes a slitting section to slit an electrode raw material sheet for an electrical component; a forming section to conduct smoothing of the convex portion on the slit electrode; electrode cleaning sections to remove fragments adhered on the slit electrode; and, a slitting method of electrode raw material sheet.

16 Claims, 16 Drawing Sheets

Rotational Direction

United States Patent

US 6,634,270 B2

SLITTER FOR AN ELECTRODE RAW MATERIAL SHEET AND THE SLITTING PROCESS

BACKGROUND OF THE INVENTION

1. Field of the Invention

The present invention relates to slitting an electrode raw material sheet for an electrical component.

2. Description of Prior Art

FIG. 16 shows a conventional slitter to slit an electrode raw material sheet. The slitter (a) comprises an unwinding section (c) in a frame (b), a splice (f), a feed/nip roller g, a slitting section (d), an electrode cleaner (h), an electrode holder (i), and winding sections (e), (e). All the components of the slitter (a) are located close to one another, affecting operability and accessibility, thus making it difficult to reconnect an electrode that inadvertently detaches from the slitting process. Further, the slitter (a) is designed so that the wide electrode raw material sheet (j) wound on the unwinding section (c) is slit at the slitting section d to form plural slit narrower electrode bands to be wound on plural winding sections (e), (e). However, convex portions created on plural electrode bands when the sheet is slit causes potential complications, e.g., short-circuit, on an electrical component when utilizing an electrode.

OBJECT AND SUMMARY OF THE INVENTION

An object of this invention is to provide an electrode with an excellent quality for an electrical component. Another object of this invention is to provide an improved electrical component with less possibility for defects and to provide a slitter with improved access to the components inside.

More specifically, this invention provides a slitter for slitting an electrode raw material sheet comprising an unwinding section to supply an electrode raw material sheet to an electrical component, a slitting section having a slitter to slit the electrode raw material sheet, and a winding section to wind the slit electrode. Further, the unwinding section, slitting section and winding section are positioned apart from each other so as to increase the operability and accessibility. Moreover, this invention is a slitter for an electrode raw material sheet comprising an unwinding section to supply an electrode raw material sheet for an electrical component, a slitting section having a slitter to slit the electrode raw material sheet, a forming section to form a convex portion on the slit electrode, an electrode cleaning section to clean fragments on the electrode, and a winding section to wind the slit electrode. This invention is also a method of slitting an electrode raw material sheet of an electrical component comprising steps of slitting the electrode raw material sheet of the electrical component by a blade section, forming convex portions on the slit electrode and removing fragments adhered on the slit electrode.

These advantages and other novel features of the present invention will become apparent in the following detailed description of the invention when considered in conjunction with the accompanying drawings.

BRIEF DESCRIPTION OF THE DRAWINGS

A better understanding of the present invention will be had when reference is made to the accompanying drawings, wherein identical parts are identified by identical reference numbers and wherein.

DETAILED DESCRIPTION OF PREFERRED EMBODIMENT

The embodiments of the invention are next described while referring to the accompanying drawings.

(a) Electrical Component

In an electrical component, in which ions migrate between electrodes, ion conductive materials are arranged between electrode structures as electrodes. The ions migrate within the ion conductive materials and create an electric current flow between the electrodes. For instance, an electrical component may include a battery, an electrical double layer capacitor, etc.

In a battery, ion conductive materials are arranged between two types of electrode structures, i.e., a positive electrode structure and a negative electrode structure, and ions (including protons, i.e., cations of hydrogen) migrate from one electrode structure to the other electrode structure, where the ions accumulate. In an electrical double layer capacitor, ion conductive materials are arranged between a pair of electrode structures and an electrical double layer is formed between a material with a high surface area in the electrode structure and an electrolyte of the ion conductive material.

(b) Electrode Structure

Figure 1:
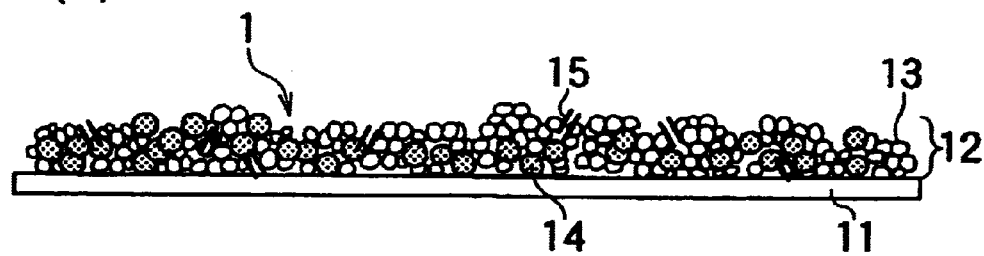
FIG. 1(A) is a drawing of the positive electrode structure containing electrode material.
FIG. 1(B) is a drawing of the negative electrode structure containing electrode material
FIG. 1(C) is a drawing of the electrode structure for the electrical double layer capacitor.
FIG. 1(D) is a drawing of the positive electrode structure in which the electrode material of FIG. 1(A) is coated by the ion conductive polymer.
FIG. 1(E) is a drawing of the negative electrode structure in which the electrode material of FIG. 1(B) is coated by the ion conductive polymer.
FIG. 1(F) is a drawing of the electrode structure for the electrical double layer capacitor in which the electrode material of FIG. 1(C) is coated by the ion conductive polymer.
Figure 1:
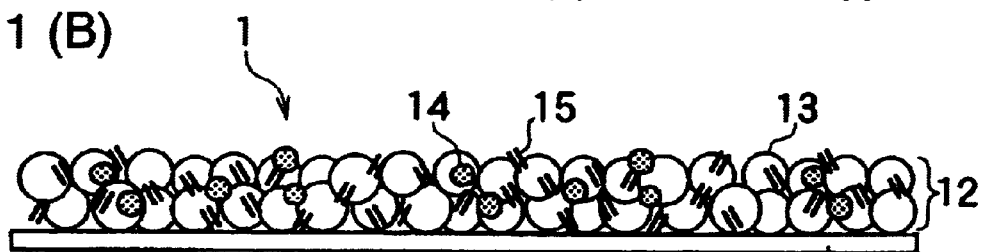
Figure 1:
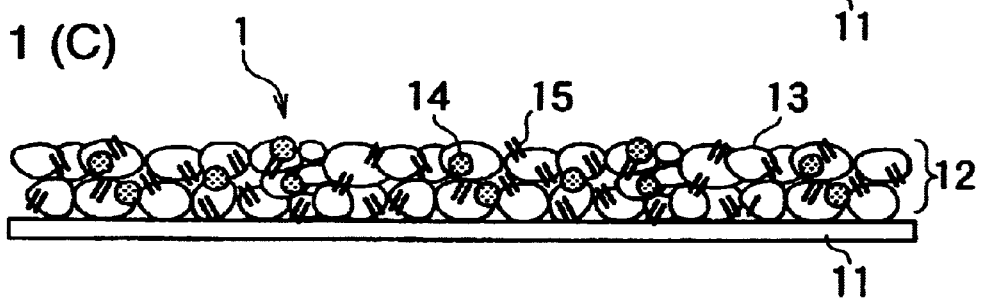
Figure 1:
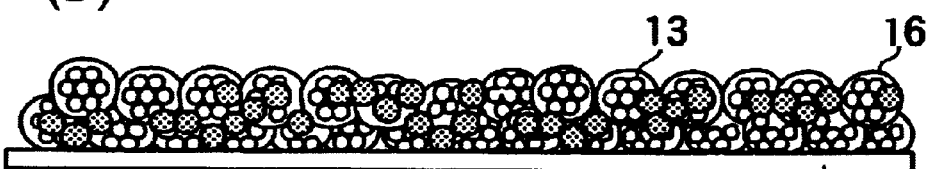
Figure 1:
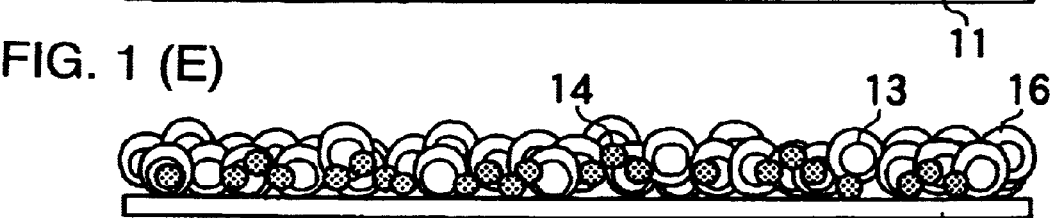
Figure 1:
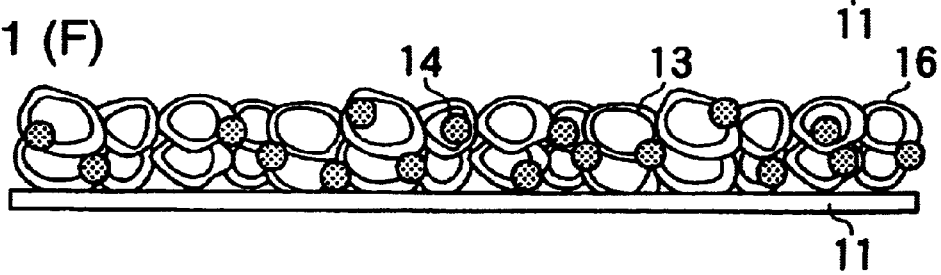

An electrode structure is used as an electrode of an electrical component and can deliver and receive electricity to and from ions, or the electrode structure can attract ions. Referring to FIG. 1, an electrode structure 1 comprises a layer of electrode material 13 (an electrode material layer 12) on a current collective member 11. The current collective member 11 is a conductive material such as aluminum or copper, so that the electrode material can deliver and receive electricity to and from ions and can attract electric power. As shown in FIG. 1(A), the electrode material 13 is used as a positive electrode structure for a battery using particulate material comprising bonded particles of powdery electrode active material such as $LiCoO_2$. As shown in FIG. 1(B), the electrode material 13 is used as a negative electrode structure for a battery and uses particulate material such as graphite, hard carbon, etc. as powdery electrode active material. As shown in FIG. 1(C), the electrode material 13 uses particulate material such as activated carbon, i.e., a powdery high surface area material with a large surface area, and is used as an electrode structure 1 for an electrical double layer capacitor. While in FIG. 1 the electrode material layer 12 is shown to be formed on one surface of the current collective member 11, the electrode material layer 12 may also be formed on both surfaces of the current collective member 11.

In FIG. 1(D), the powdery electrode active material 13 of FIG. 1(A) is covered with an ion conductive polymer, and it is used as a positive electrode structure of a battery. In FIG. 1(E), the powdery electrode active material 13 of FIG. 1(B) is covered with an ion conductive polymer, and is used as a negative electrode structure for a battery. In FIG. 1(F), the powdery electrode material 13 of FIG. 1(C) is covered with an ion conductive polymer, and it is used as an electrode structure 1 of an electrical double layer capacitor.

Figure 2:
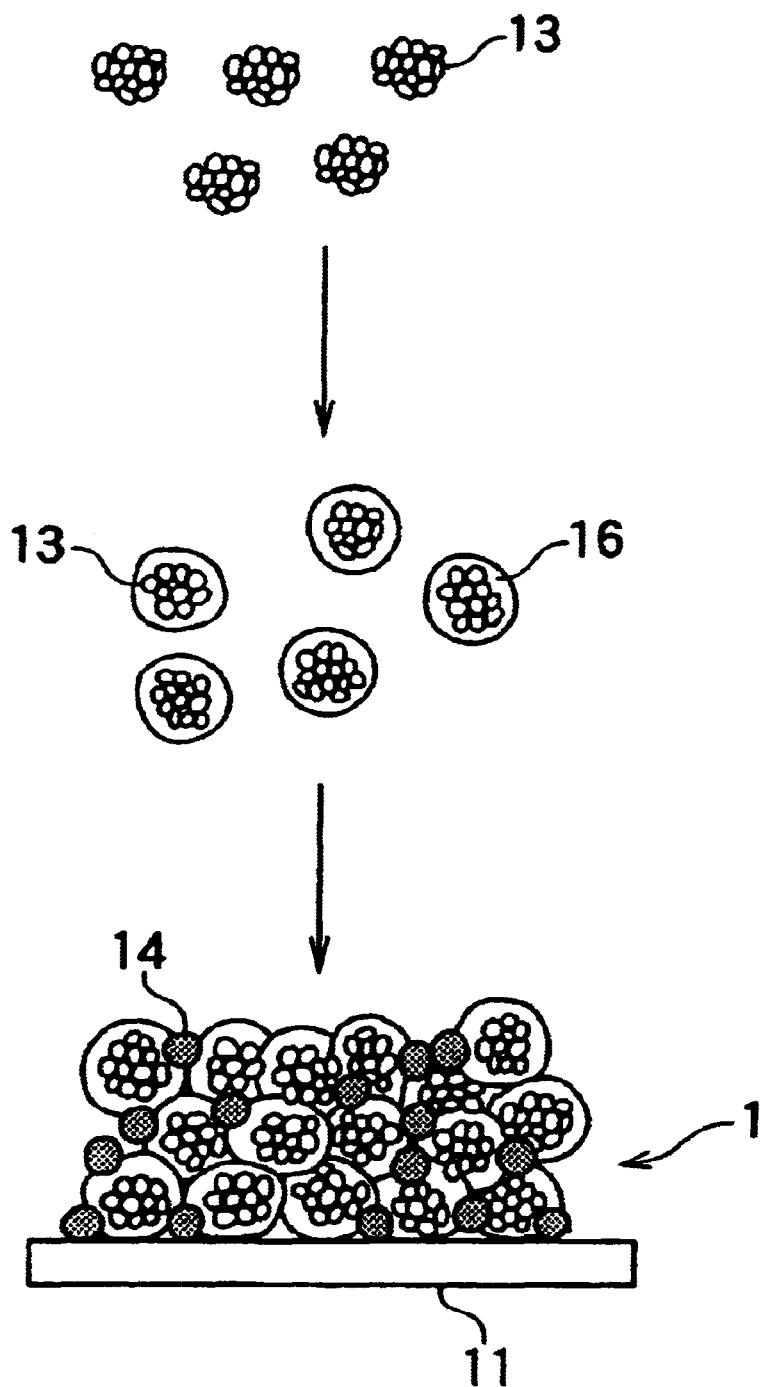
FIG. 2 is a drawing of the electrode structure containing active electrode material.

FIG. 2 shows a process to produce the electrode structure 1 of FIG. 1(D). As shown in FIG. 2, the powdery electrode material 13 comprises bonding particles such as $LiCoO_2$, that is covered with an ion conductive polymer 16 and is attached to a current collective member 11. The electrode structure 1 as shown in each of FIG. 1(E)–FIG. 1(F) can also be produced in a similar manner. The conductive material 14 arranged in the electrode structure enhances electrical and electronic conductivity between the electrode materials, while also enhancing the electrical conductivity between the electrode material 13 and the current collective member 11 improving the current collecting efficiency.

Here, "adhere" or "adhesion" means that ions are attached in such manner that the ions can migrate between the ion conductive polymer 16 and the entire surface of the powdery electrode material 13. "Adhere" or "adhesion" also means that the ion conductive polymer 16 adheres to the surface of the powdery electrode material 13 and covers the powdery electrode material with the ion conductive polymer 16. The finer the particles, the more active the powdery electrode material 13. When the powdery electrode material 13 is adhered to and covered by the ion conductive polymer 16, the activity is suppressed and can be turned into a more stable state.

When the deposit of the ion-conducting polymer 16 is thick, the electrical conduction decreases and the current (charge) collection is poor. Thus, use of a thin coating of the ion-conducting polymer is preferable.

The word "powdery" in the powdery electrode material 13 and the powdery conductive material 14 means the condition of a material is in a fine powder state. In certain cases, this fine particle substance refers to a state wherein a large number of substances in a fine particle state constitute an agglomeration.

Relation to terminologies used to explain the electrode structure 1 will be explained hereunder. In FIG. 1, the electrode structure 1 is obtained by forming the electrode material layer 12 on the current collective member 11. The electrode material layer 12 has the electrode material 13 and also an electrically-conductive material 14 and a binder 15 as required. The electrode material 13 is an electrode active material used as an electrode of a battery or a high surface area material such as electrical double layer capacitor. The electrode active material means a powdery electrode active material such as $LiCoO_2$ to be used as a positive electrode, or a powdery electrode active material such as carbon material to be used as a negative electrode.

(a) Formation of the Ion Conductive Polymer Layer to the Electrode Structure

The ion conductive polymer layer 16 is formed on a surface of the electrode structure 1. Dissolving ions on the ion conductive polymer layer 16 facilitates migration between the pair of electrode structures. Simultaneously, the electrodes facing each other do not contact, thereby eliminating the possibility of causing a short-circuit within the electrode.

(b) Electrode Raw Material Sheet

The electrode raw material sheet is slit to be used as electrode bands and may be used as the electrode structure formed on a wide surface of the current collective member or the electrode structure forming the conductive polymer layer thereon.

(c) Electrode Active Material

As the electrode active material, either a material where ions can be placed into or removed from, or a π-conjugate conductive macromolecular material may be used. There is no specific restriction on the use of a particular electrode active material for use as a positive electrode of a nonaqueous electrolyte battery; however, a chalcogen compound where lithium ions can be placed into or removed from, or a complex chalcogen compound containing lithium may be used for a chargeable secondary battery.

$FeS_2$, $TiS_2$, $MoS_2$, $V_2O_5$, $V_6O_{13}$, and $MnO_2$ may be utilized as the above-chalcogen compounds. A chalcogen compound having lithium as described above includes $LiCoO_2$, $Li_xNiyM_{1-y}O_2$ (where M represents at least one type of metal element selected from transition metal or aluminum, or more preferably, it represents at least one type of metal element selected from Co, Mn, Ti, Cr, V, or Al, and $0.05 \leq x \leq 1.10$ and $0.5 \leq y \leq 1.0$), e.g., $LiNiO_2$, $LiMnO_2$, $LiMn_2O_4$. Starting materials, such as oxide, salt or hydroxide of lithium, cobalt, nickel, or manganese, are mixed in adequate composition, and the mixture is fired in the temperature range of 600° C.–1000° C. under oxygen atmosphere.

There are no particular restrictions on the electrode active substance used as the negative electrode for non-aqueous electrolyte batteries. However, a material allowing lithium ion insertion/separation may be used, and lithium metal, lithium alloys (alloys such as lithium and aluminum, lead, indium) and carbon quality materials may be utilized.

Polyacetylene types, polyaniline types, polypyrrole types, polythiophene types, poly-ρ (para)-phenylene types, polycarbazole types, polyacene types and sulfur polymer types are among the useful π-conjugated conductive macromolecular materials.

In particular, in a nonaqueous electrolyte primary battery, higher battery capacity can be obtained when lithium metal is used in the negative electrode. Lithium metal not in powdery state may also be used.

Also, in the nonaqueous electrolyte secondary battery, excellent cycle service life can be attained if a carbon material where lithium ions can be placed into and removed from is used as the negative electrode. There are no particular restrictions on the carbon material used; materials such as pyrolytic carbon types, coke types (pitch coke, needle coke and petroleum coke, etc.) graphite types, glass carbon types, organic macromolecular compound fired products (carbonized pieces baked to a suitable temperature such as phenol resin, furan resin) carbon fibers and active carbon may be utilized.

(d) Electrode Material with a Large Surface Area

The electrode material with a large surface area is a powdery high surface area material, which can attract many ions to the surface. Preferably, it has a specific surface area of 500 m$^2$/g or more, or more preferably 1000 m$^2$/g or more, or most preferably 1500 m$^2$/g–3000 m$^2$/g. Also, it has preferably average particle size of 30μ or less, or more preferably 5–30 μm. If the specific surface area and average particle size are out of the above range, capacitance is too high, and it may be difficult to obtain an electrical double layer capacitor with low resistance.

As the powdery high surface area material, it is preferable to use activated carbon, which can be obtained from carbon material by a steam activation method or by melted KOH activation process. As the activated carbon, coconut shell activated carbon, phenol type activated carbon, petroleum cokes type activated carbon, polyacene, etc. may be used. These materials can be used alone or in a combination of two types or more. Among those, because of a large electrostatic capacity, phenol type carbon, petroleum cokes type activated carbon, and polyacene are preferred.

(e) Electrically-conductive Material

The conductive material is used to increase electrical conductivity of the electrode structure, and there is no specific restriction on the material used. For instance, carbon black, ketchen black, acetylene black, carbon whisker, natural graphite, artificial graphite, metal fiber, and metal power such as titanium oxide, ruthenium oxide, etc. may all be used. These materials may be used alone or in a combination of two types or more. Above all, it is preferable to use one type of carbon black, i.e. ketchen black or acetylene black. Average particle size of the powdery conductive material is preferably 10–100 nm, or more preferably 20–40 nm.

(f) Ion Conductive Salt

As the ion conductive salt, any material normally used for electrochemical product may be used, and there is no specific restriction. In particular, it is preferable to use a salt obtained by combination of quaternary onium cation expressed by the general formula $R^1R^2R^3R^4N^+$ or $R^1R^2R^3R^4P^+$ (where $R^1$–$R^4$ each represents an alkyl group having 1–10 carbon atoms and may be the same or different) with anion such as $BF_4^+$, $N(CF_3SO_2)_2^-$, $PF_6^-$, $ClO_4^-$, etc.

More concretely, as the ion conductive salt used for the double-layer capacitor, the following materials may be used: $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph—CH_2)PBF_4$ (where Ph represents a phenyl group), $(C_2H_5)_4PPF_4$, $(C_2H_6)PCF_3SO_2$, $(C_2H_5)_4NBF_4$, $(C_4H_9)_4NBF_4$, $(C_6H_{13})_4NBF_4$, $(C_2H_6)_6NPF_6$, $LiBF_4$, $LiCF_3SO_3$, etc. These materials may be used alone or in a combination of two types or more.

As the ion conductive salt used for a nonaqueous electrolyte secondary battery such as a lithium ion battery, any material normally used for electrochemical product may be used, and there is no specific restriction. For instance, $LiClO_4$, $LiBF_4$, $LiAsF_6$, $LiPF_4$, $LiSbF_6$, $LiCF_8SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $(C_4H_9)_4NClO_4$, $LiN(CF_3SO_2)_2$, $Et_4NPF_3$ (where Et represents an ethyl group), etc. may all be used. These materials may be used alone or in a combination of two types or more.

(g) Electrolyte

As organic electrolyte, for example toroidal or heterocyclic carbonate, heterocyclic carboxylic acid ester, toroidal or heterocyclic ester, phosphoric acid ester, lactone compounds, compounds such as amide compounds, or a mixture of the above, may be employed. As the toroidal carbonate, alkylene carbonate such as butylenes carbonate, propylene carbonate (PC), and ethylene carbonate (EC) may be employed. As the heterocyclic carbonate, dialkene carbonate such as diethyl carbonate (DEC), dimethyl carbonate (DMC), and methyl carbonate (MEC) may be employed. As the heterocyclic carboxylic acid ester, for example methyl acetate and propionic acid methyl may be employed. As the toroidal or heterocyclic ether, tetrahydrofurane, 1,3-dioxolan, and 1,2-dimethoxyethane may be employed. As the phosphoric ester, phosphoric acid trimethyl, phosphoric acid ethyldimethyl, phosphoric acid diethylmethyl, phosphoric acid tripropyl, phosphoric acid tributyl, phosphoric acid trifluoromethyl, phosphoric acid trichloromethyl, phosphoric acid trifluoroethyl, phosphoric acid triperfluoroethyl, 2-ethoxy 1,3,2-dioxaphosphoran-2-on, 2-trifluoroeethoxy-1,3,2-dioxaphosphoran-2-on, 2-methoxyethoxy-1,3,2-dioxaphosphoran-2-on may be employed. As a lactone compound, γ-butyrolactone may be employed. As a nitrile compound, acetonitrile may be employed. As an amide compound, dimethylformamide may be employed. Among these, it is preferable if toroidal carbonate, heterocyclic carbonate, phosphoric acid ester, or a mixture of these are utilized if using a battery action with high charge-discharge capacity and high power output.

(h) Ion Conductive Polymer

The ion conductive polymer is a polymer, which can dissolve at least an ion conductive salt, such as a lithium salt as explained below, at a concentration of 0.1 M (mol/l) or more, and the polymer dissolving ion conductive salt, such as lithium salt, at a concentration of 0.1 M or more shows electrical conductivity of $10^{-8}$ S (siemens)/cm or more at room temperature. Preferably, it is an ion conductive polymer, which at least dissolves an ion conductive salt, such as lithium salt, at a concentration of 0.8–1.5 M and exhibits electrical conductivity of $10^{-3}$ S/cm–$10^{-5}$ S/cm at room temperature.

The lithium salt is at least one type of lithium salt having $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ as an ion.

Here, the relationship of the terms relating to the ion conductive polymer will be described. The material for forming the ion conductive polymer is a material for preparing ion conductive polymer layer 2 to be formed on the electrode structure 1 or an ion conductive polymer, which is adhered to powdery electrode material. It represents an ion conductive polymer itself, an ion conductive polymer raw material, or both. A coating material 22 is a material used to coat the ion conductive polymer layer 2, and is a mixture of the material for forming ion conductive polymer itself or ion conductive salt or solvent.

(i) Ion Conductive Polymer Raw Material

The ion conductive polymer raw material is a material which is turned into ion conductive polymer by polymerization, crosslinking, etc. when energy is added. The energy to be added may be in the form of heat, ultraviolet ray, light, electronic beam, etc. The ion conductive polymer raw material is added to give physical strength such as a form retaining property.

Under a condition where the ion conductive polymer itself and the ion conductive polymer raw material coexist, energy is added from outside, and the ion conductive polymer raw material is allowed to reactforming a 3-dimensional network. In this case, the ion conductive polymer itself is entangled within the 3-dimensional network (entanglement). This is called "semi-interpenetrating network system" and exhibits excellent physical properties. The ion conductive polymer having such a structure is described in the patent publication JP-A-8-225626 to the inventors of this invention. The ion conductive polymer thus obtained has a high strength, absorbs the solvent well and has a high adhesive strength. The ion conductive polymer obtained from the ion conductive polymer itself and ion conductive polymer raw material is such that a polymer dissolving lithium salt at a concentration of 0.1 M or more shows electrical conductivity of $10^{-8}$ S (siemens)/cm or more, or more preferably $10^{-5}$ S/cm or more, or most preferably $10^{-3}$ S/cm or more at room temperature. A cellulose type semi-interpenetrating network system (IPN) is described in JP-A-8-225626, PVA type semi-interpenetrating network system is disclosed in Japanese Patent Application 11-78087 (PCT/JP 00/01734), polyglycidol semi-interpenetrating network system is disclosed in Japanese Patent Application 10-358825 (PCT/JP 99/07039), and polyurethane type semi-interpenetrating network system is disclosed in Japanese Patent Application 11-78085 (PCT/JP 00/01731).

(j) Current Collective Member

The current collective member 11 may be any material which allows electric current to flow. The shape and material are selected depending upon each electrical component. For example, a conductive material such as aluminum, copper, etc. is formed in a planar shape, or in form of foil or mesh. The surface is processed by chemical, electrical or physical process or by any process combining these processes. Surface irregularities, such as a coarse texture, are formed to provide a current collective member with a better adhesion property. Where the current collective member 11 is planar shaped or a foil, one surface or both surfaces are used depending on the structure of the electrical component, and the electrode material is attached on one surface or both surfaces. A wider current corrective member may be used for an electrode raw material sheet.

In the following, a method for manufacturing the electrode raw material sheet will be described:

(a) Process of Manufacturing Electrode Raw Material Sheet

In a process of manufacturing electrode raw material sheet 4, a solvent is added to the electrode material to turn it into a liquid and paste-like state to be thinly coated on the surface of the current collective member 11. After coating, the solvent is evaporated, the product is dried, and an electrode raw material sheet 4 with the electrode material layer 12 formed on the wide current collective member is obtained. A doctor's knife applicator or similar device is used to coat the current collective member 11. The electrode material 13 existing in the electrode material layer 12 may be coated with ion-conducting polymer 16. In addition, a binder such as a non-ion conducting polymer such as PVDF may be used here.

Figure 3:
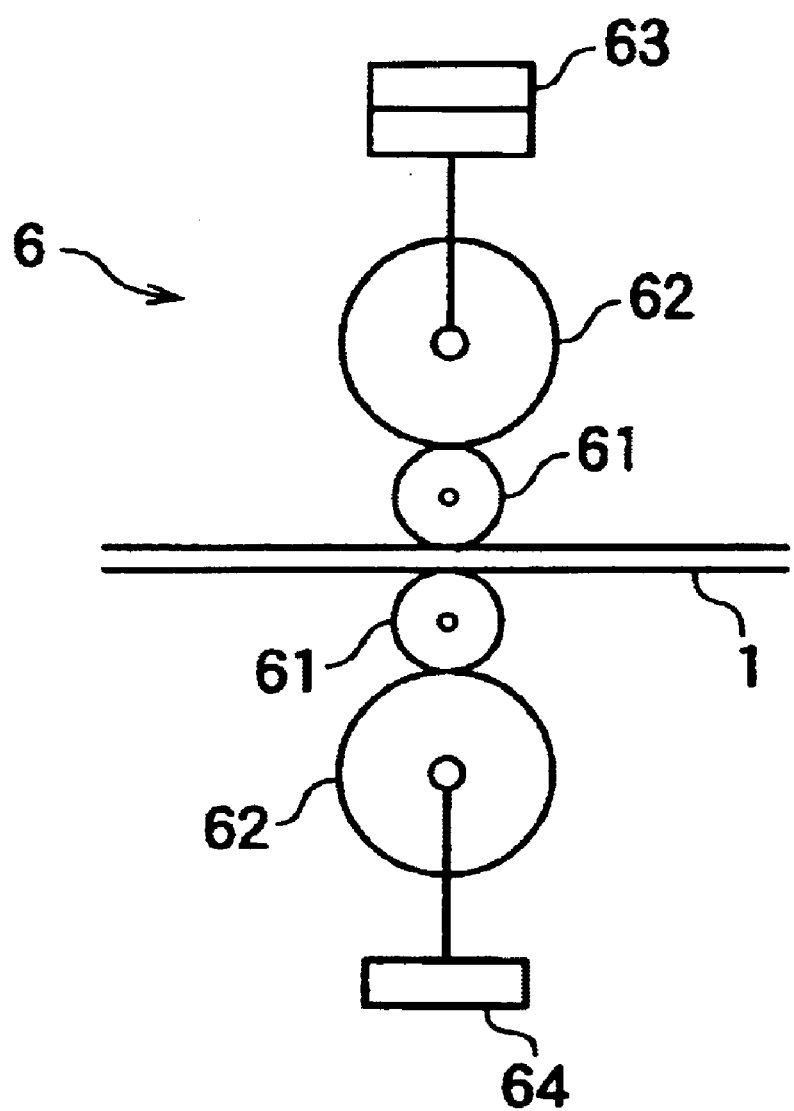
FIG. 3 is a drawing describing a fixing or adhesion device.

The electrode material layer 12 thus coated and dried may be pressed against the current collective member 11 to tightly fix it thereon. To fix this, a fixing or adhesion device 6 as shown in FIG. 3 is used. In the fixing or adhesion device 6, the electrode raw material sheet is produced by sandwiching an electrode structure 1 between pressure rollers 61, 61 rotating the backup rollers 62, 62 under pressure between the pressure device 63 and a fixed member 64, and tightly fixing the electrode material layer 12 on the current collective member 11. As with the electrode raw material sheet 4, the ion-conducting polymer layer 2 may be attached on the electrode material layer 12.

Accordingly, the electrode raw material sheet obtained may be 100–200 μm in total thickness depending on the condition of fixing. However, the tensile strength is approximately 1 kg/cm, which has a significantly lower edge strength compared to a magnetic tape and a metallic foil.

(b) Formation of the Ion Conductive Polymer Layer to the Electrode Structure

Figure 4:
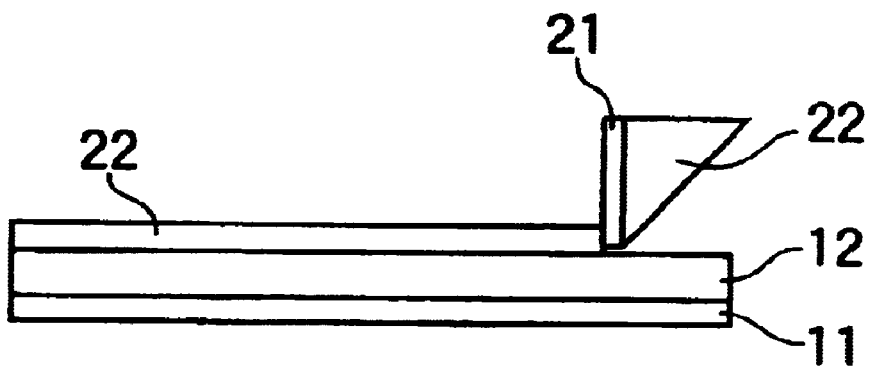
FIG. 4(A) is a drawing showing the surface of the electrode material layer on which the ion conductive polymer layer is thinly coated using the doctor knife applicator.
FIG. 4(B) is a drawing showing the ion conductive polymer layer formed on the electrode structure.
FIG. 4(C) is a drawing showing the ion conductive polymer layer after purging the solvent therefrom.
Figure 4:
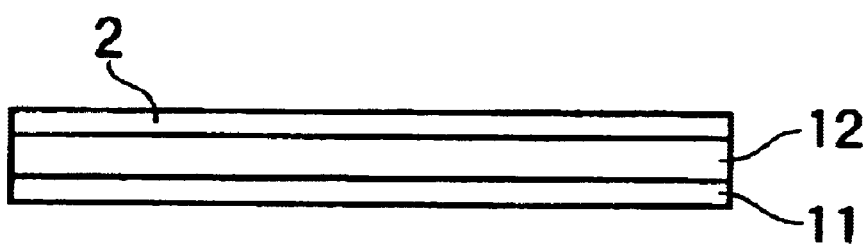
Figure 4:
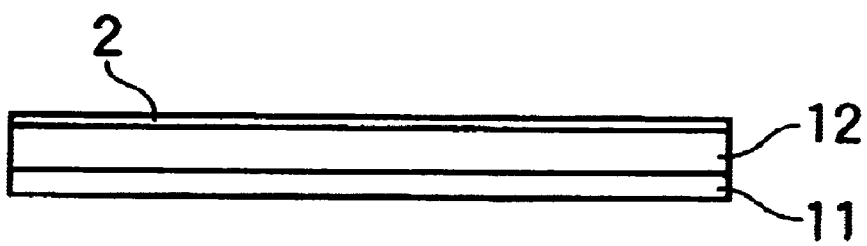

A coating material 22 for forming a paste-like ion conductive polymer layer to serve as the ion conductive polymer layer 2 is thinly coated on the surface of the electrode material layer 12 of the electrode structure 1 as shown in FIG. 4 using a doctor knife applicator 21 (FIG. 4(A)), and an ion conductive polymer layer 2 is formed on the electrode structure 1 (FIG. 4(B)). The coating material 22 is a material for forming the ion conductive polymer layer 2 by coating, and it is the ion conductive polymer forming material or a mixture of this with ion conductive salt such as lithium salt or a solvent. In case of the coating material 22 for forming ion conductive polymer layer, which is a mixture of ion conductive polymer forming material with an organic solvent, it is dried after coating, and the solvent is purged from the ion conductive polymer layer 2 (FIG. 4(C)). When the coating material 22 for forming ion conductive polymer layer mixed with ion conductive salt such as lithium salt is coated on the ion conductive polymer forming material, ions such as lithium ions are dissolved in the ion conductive polymer layer 2.

In the following, a slitter to slit the electrode raw material sheet will be described:

(a) Slitter

Figure 5:
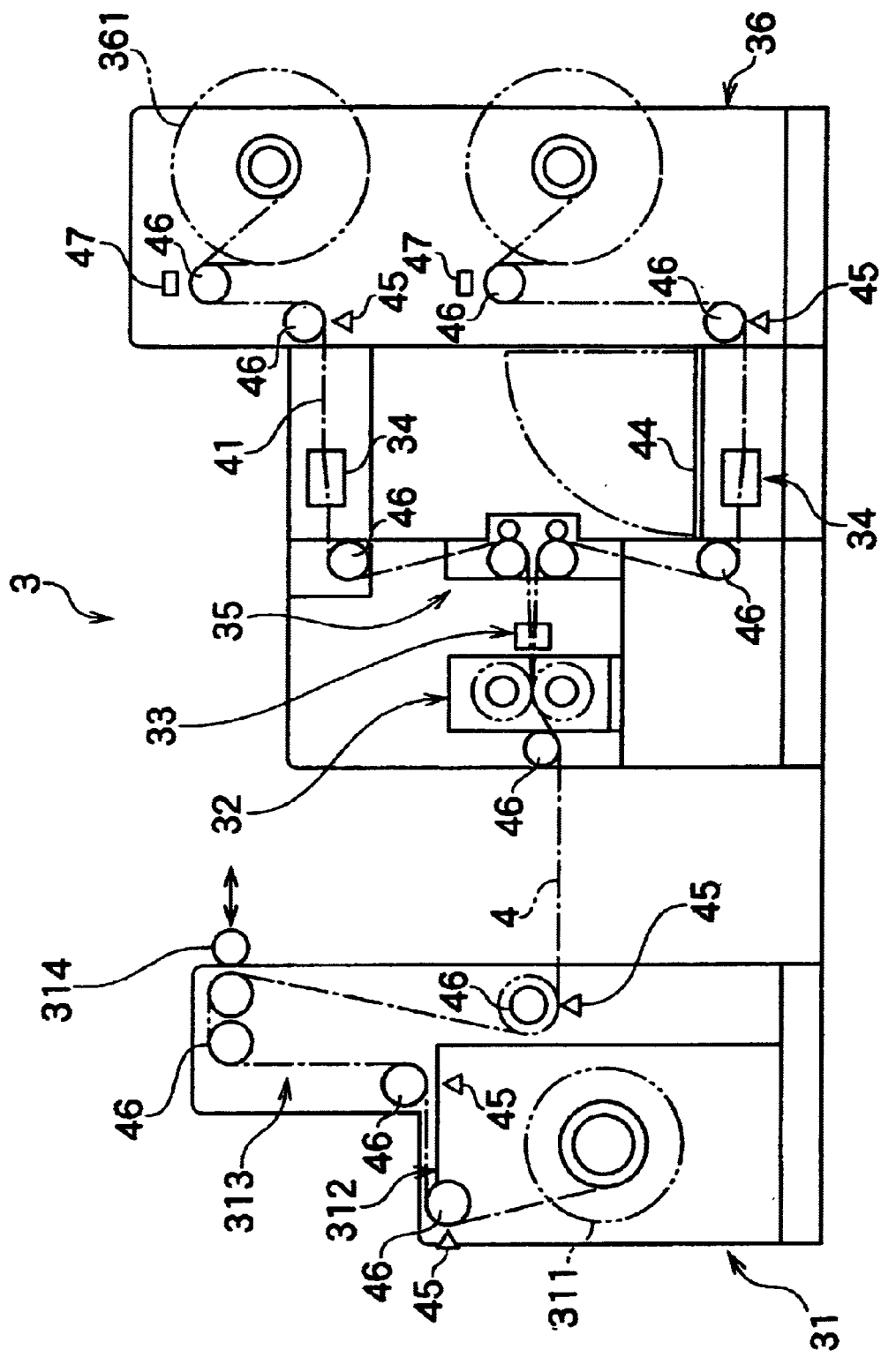
FIG. 5 is a drawing of the slitter structure.

The slitter 3 is to slit the electrode raw material sheet 4 into a predetermined size, an example of a slitter is shown in FIG. 5. The slitter 3 for the electrode raw material sheet 4 comprises the following: an unwinding section 31 to supply the electrode raw material sheet 4; a slitting section having a slitter for the electrode raw material sheet 4; a forming section 35 to form a convex portion of the slit electrode; cleaning sections, i.e., a first electrode cleaning section 33 and a second electrode cleaning section 34, to clean fragments on the electrode; and, a winding section 36 to wind the cleaned electrode. The unwinding section 31, the slitting section 32 and the winding section 36 are positioned away from each other as shown in FIG. 5 positioned near the floor. The unwinding section 31, the slitting section 32, and the winding section 36 are independently positioned as required. A rotatable workbench 44 stands or lays between the slitting section 32 and the winding section 36 as shown in FIG. 5. An operator may step on the workbench 44 to operate. Accordingly, by positioning the unwinding section 31, the slitting section 32, and the winding section 36 away from each other and positioning the workbench 44 as described above, increase operability of the slitter, which facilitates the reconnection of an electrode when accidentally cut off.

Figure 6:
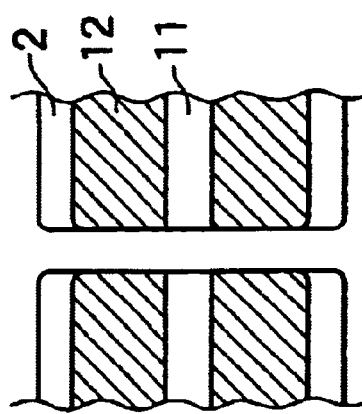
FIG. 6(A) is a drawing showing the slitting of the electrode raw material sheet into electrode bands by the blade section.
FIG. 6(B) is another drawing showing the slitting of the electrode raw material sheet while the blade section is slitting the same.
FIG. 6(C) is a drawing showing high edges created on the slit electrode raw material sheet after the slitting.
FIG. 6(D) is a drawing showing smooth edges of the electrode raw material sheet after being pressed by a forming section.
Figure 6:
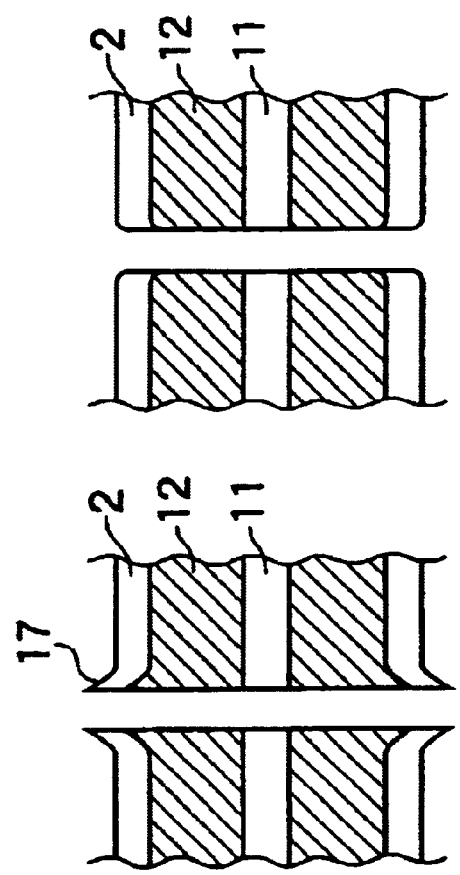
Figure 6:
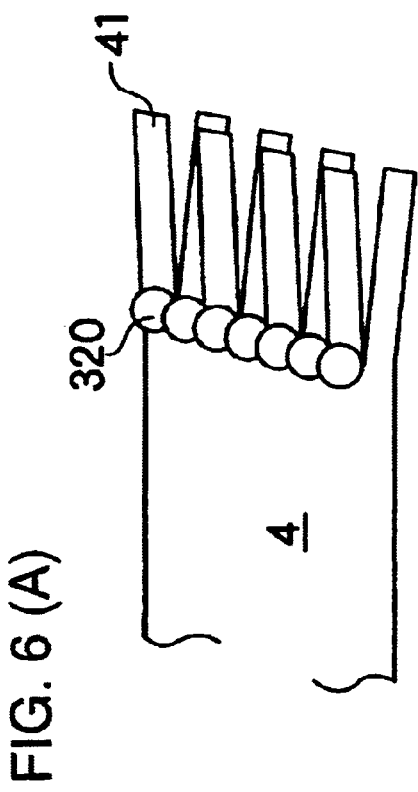
Figure 6:
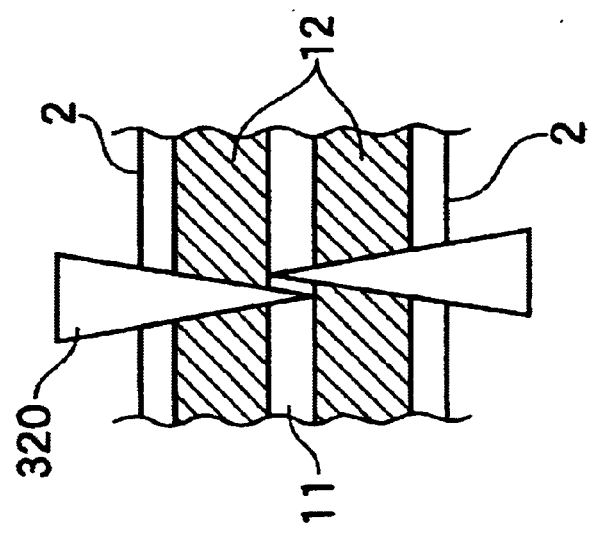

As shown in FIG. 6(A), the wide electrode raw material sheet 4 is slit into electrode bands 41 by a blade section 320, and the slit adjacent electrode bands 41 are orthogonally separated up and down relative to a pre-slit electrode surface. As shown in FIG. 6(B), a blade section 320 slits the wide electrode raw material sheet 4 when tips of the blades byte in the electrode raw material sheet 4. Accordingly, as in FIG. 6(C), the convex portion 17, i.e., a projection or high edge portion, is created around the slit portion. The convex portion 17 on the electrode potentially causes a short-circuit between the electrodes and possibly has a negative effect on the electrical component. Then, the forming section 35 presses the convex portion 17 as in FIG. 6(D) to conduct smoothing on the surface.

(b) Unwinding Section

The unwinding section 31 supplies the electrode raw material sheet 4 to the slitting section 32. In case of using a wide electrode raw material sheet, the unwinding section 31 is equipped with an unwinding core-like member 311 to wind to hold the electrode raw material sheet 4. The electrode raw material sheet 4 unwound from the unwinding core-like member 311 is pulled by an infield roller 314, guided by a guide rollers 46, 46, passed through a temporally fixing section 312 having a horizontally arranged splice mount, passed through a vertically positioned observation section 313 and each tension detection section 45, and supplied to the slitting section 32. The temporally fixing section 312 is a section to connect the end of the previous electrode raw material sheet 4 and the top of the current electrode raw material sheet 4. The observation section 31 is a section where the operator observes the movement of the electrode raw material sheet 4 to find out any defective portion in the electrode raw material sheet 4 and any failure in the movement. The infield roller 314 controls the infield movement of the electrode raw material sheet 4 and also controls the tension accordingly. The tension of the electrode raw material sheet 4 is detected by each tension detecting section 45 before and after the infield roller 314.

(c) Slitting Section

Figure 7:
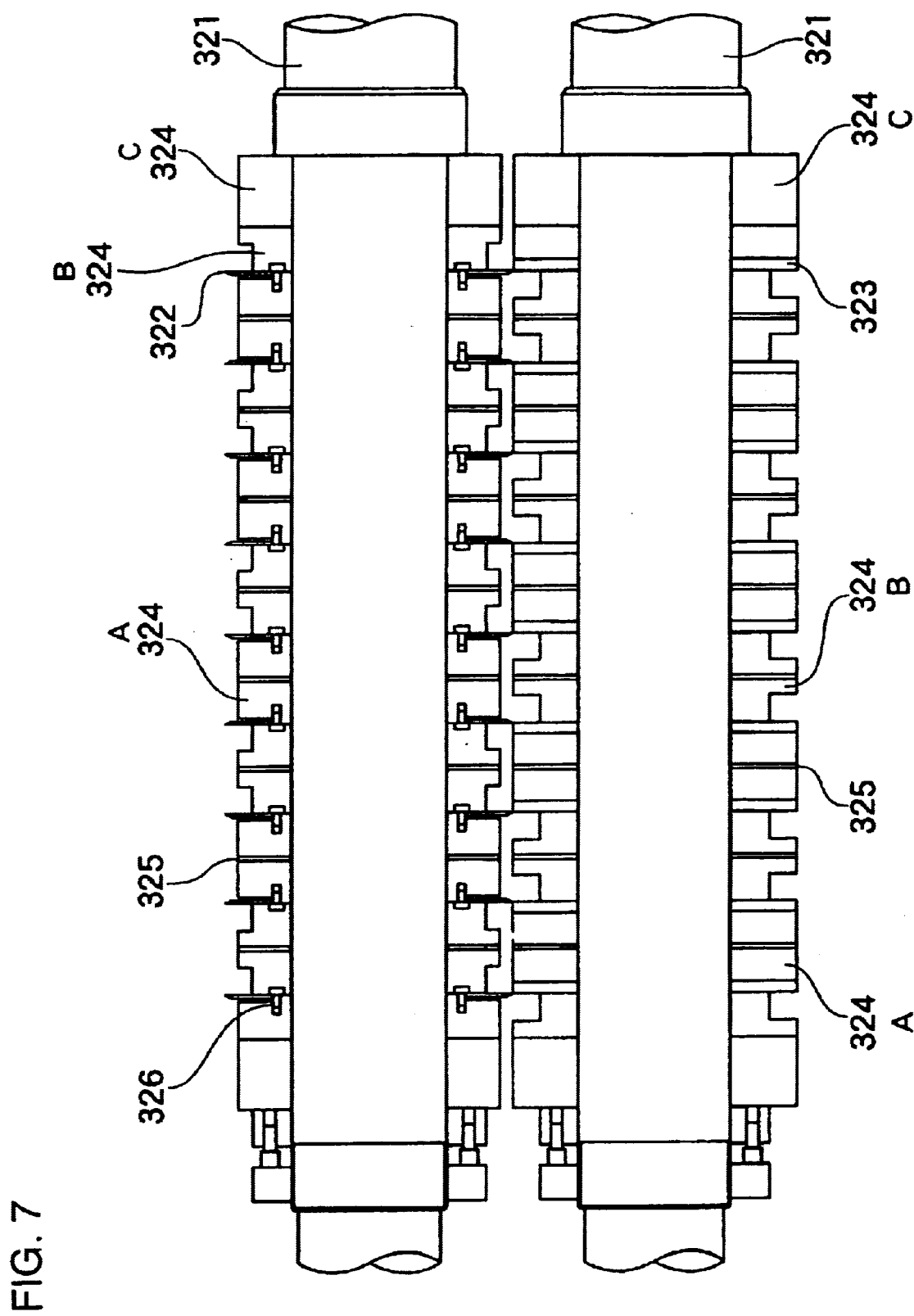
FIG. 7 is a drawing of the upper and lower blades in the slitting section.

The slitting section 32 has knives, i.e., blade section 320, to slit the electrode raw material sheet 4. As shown in FIG. 7, the blade sections 320, 320 are fixed on an upper and a lower rotational shaft 321, 321. Upper blades 322 of the upper blade section 320 are positioned around the rotational shaft at the predetermined locations with upper spacers A, B, C, 324 and an upper gap spacer 325. The upper blades 322 are fixed with the upper spacers A by upper blade coned disc spring holders 326 at designated intervals. Therefore, a top of each upper blade 322 is deformable in the axial direction relative to the rotational shaft 321. The lower blades 323 are positioned around the rotational shaft at the predetermined locations with lower spacers A, B, C, 324 and an upper gap spacer 325. A top of each lower blade 323 is flat and is fixed on the side surface of the lower spacer A. Each upper gap spacer 325 is to adjust a gap between the adjacent upper blades 322 while each lower gap spacer is to adjust a gap between the adjacent lower blades 323. Accordingly, width of the slit electrode is defined, which provides the electrode 41 with necessary width. The electrode raw material sheet 4 as shown in FIG. 8 initially contacts the rotational shaft of the lower blade section to be inserted between the two blade sections, and the top of the upper blades 322 are deflected and deformed to be slit by upper and lower blades 322, 323 functioning like a scissor.

Figure 8:
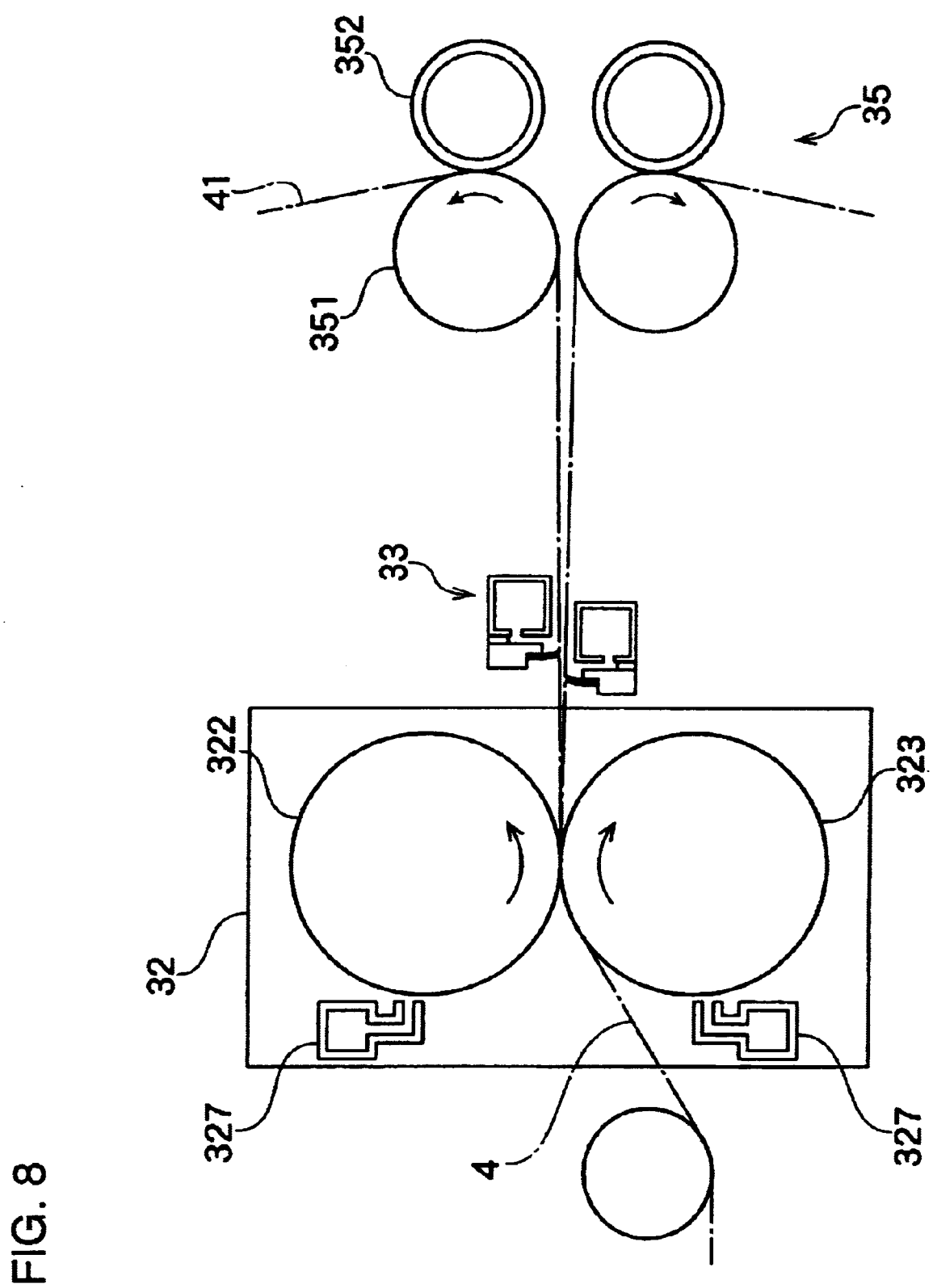
FIG. 8 is an enlarged drawing of the first electrode cleaning section and forming section.
Figure 10:
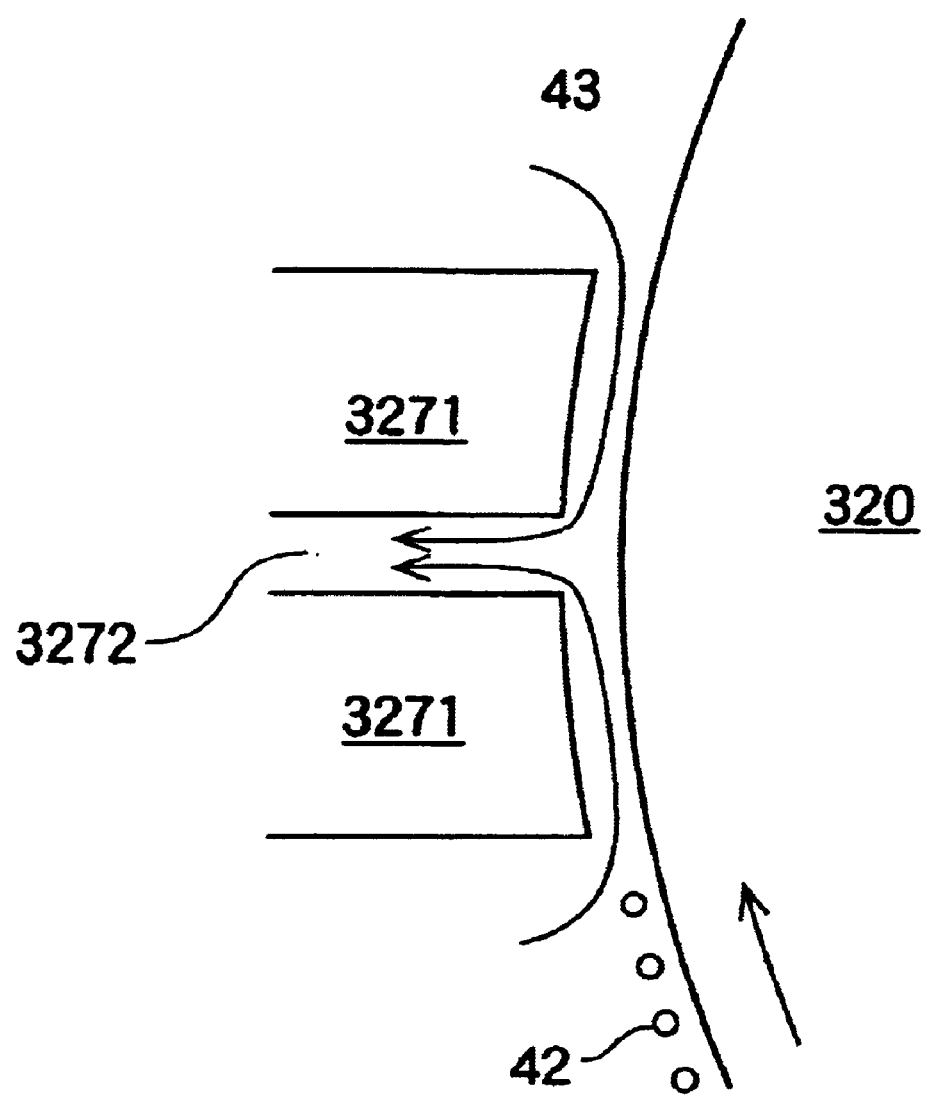
FIG. 10 is a partially enlarged drawing of the blade and the blade cleaning section.

According to FIGS. 8 and 10, fragmentsFragments 42 from the electrode layer adhered on the upper and lower blades 322, 323 are removed by blade cleaners 327, 327. For example, the blade cleaners 327, 327 are positioned near the outer circumferential surface of the upper and lower blade sections 320, 320, which supply airflow around the blade sections 320, 320 via suction, thereby removing the fragments 42. Each blade cleaner 327 has a suction device and is designed to generate an airflow with the appropriate controlled speed to separate the fragments 42 on the blade sections 320 and airflow with the appropriate speed to carry the separated fragments 42 therefrom. Accordingly, if an air duct 3272 has a wider portion, the airflow becomes slower and therefore the air duct 3272 is designed to provide constant airflow speed at any portion.

Parallel blocks 3271 of the blade cleaner 327are mounted near the blade section 320, supplies airflow of controlled speed between the blade 320 and the parallel blocks 3271, and carries the fragments by the airflow via the air duct 3272 formed in the parallel blocks 3271. The controlled speed of the airflow passing through the clearance between the blade 320 and the parallel section 3271 needs at least to be uniform, for example in the range of 0.1 mm–2 mm, preferably 0.1 mm–0.5 mm. The controlled airflow speed should be in the range of 5 m–25 m/sec. and preferably 7.5 m–20 m. The parallel section 3271 needs to be designed to an appropriate length, which enables uniform airflow and stable airflow direction.

Further, the fragments 42 mean articles that are not preferable an electrode such as powder or flakes of 30 $\mu$m–50 $\mu$m. In addition, the blade section 320 is located each at an upper side and a lower side for convenience of the explanation. However, the three-dimensional location arrangement may also be utilized if necessary.

(d) Forming Section

The forming section 35 is to smoothing/reshape a convex portion 17. The forming section 35 for example as shown in FIG. 8 has a pair of rollers sandwiching the slit electrode bands 41 therebetween, and the rollers rotate to press the convex portions 17 to conduct smoothing thereon. Each pair of rollers include a drive roller 351 and a nipple roller 352, wherein the drive roller 351 is to rotate while the nipple roller 352 is abuttable against the drive roller 351. The surface hardness of the drive roller 351 and the nipple roller 352 is decided according to the type of electrode to be formed. For a thin hard electrode, a steel roller having a hard surface may be used for both drive and nipple rollers 351, 352. For a thick elastic easily deformable electrode, a steel roller having a hard surface may be used for the drive roller 351 while a resilient roller which is more resilient than the steel roller may be used for the nipple roller 352.

Figure 9:
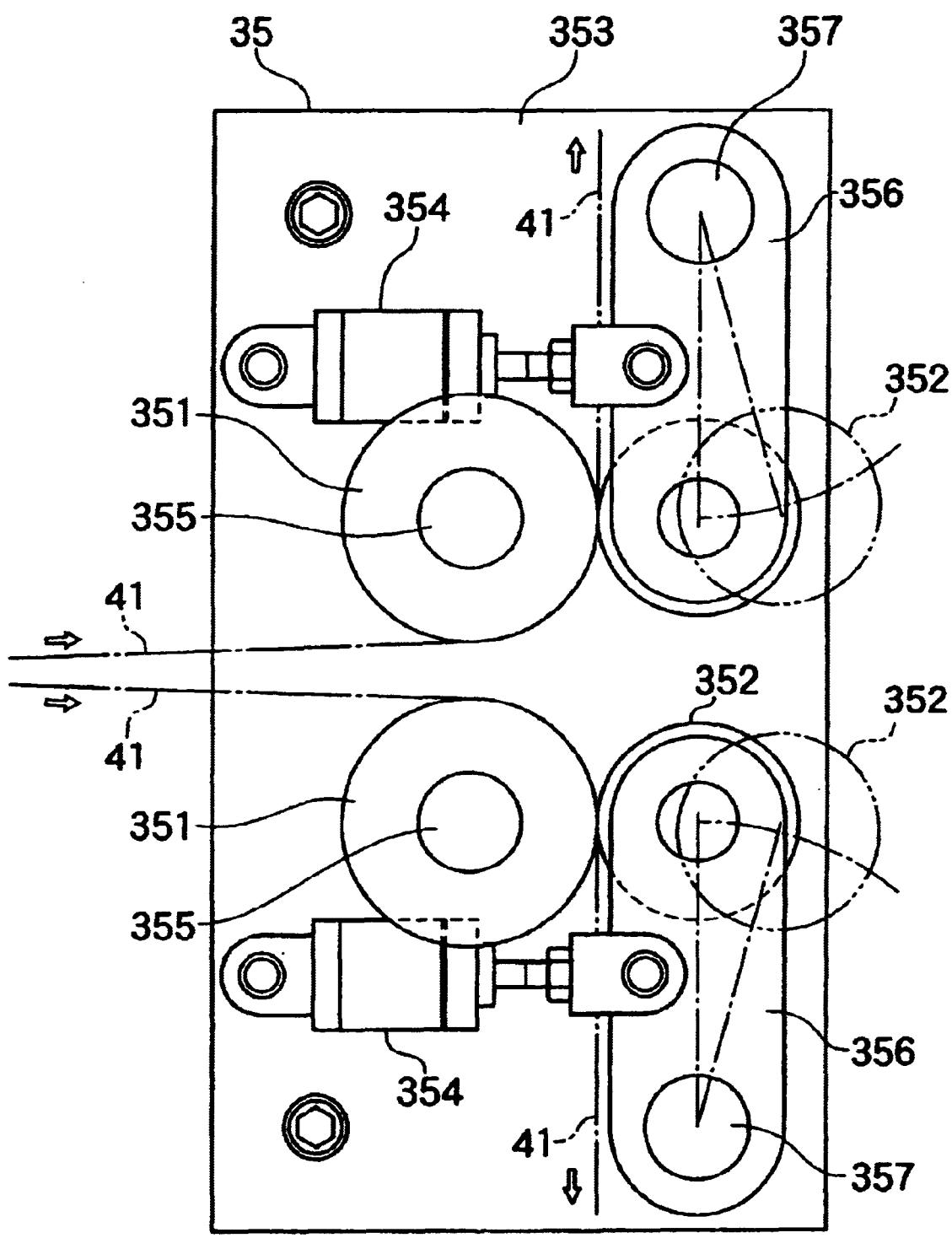
FIG. 9 is an enlarged drawing of the forming section.

As shown in FIG. 9, the drive rollers 351, 351 and the nipple rollers 352, 352 in the forming section may be mounted on a foundation base 353. The driving shaft 355 rotates the drive roller 351. The nipple roller 352 is rotatably mounted on a nipple roller arm 356 and abuts against the drive roller 351 to rotate according to the rotational speed of the drive roller 351. A cylinder 354 is connected to the nipple roller arm 356, thereby rotating the nipple roller arm 356 with the rotational axle as the fulcrum due to the telescopic motion of the cylinder 354. Because of this telescopic motion of the cylinder 354, the nipple roller 352 may be abutted against or departed from the drive roller 351, thereby adjusting the pressure at the abutment between the two rollers.

The steel roller and the resilient roller need to have sufficient hardness to form the convex portions, and the steel roller may be obtained by using a tool steel as a base metal to be coated with hard chromium plating and conducting smooth grinding on the same. In addition, as required, a hard metal and ceramic spraying may be used for finishing. The resilient roller may be polyimide or denatured urethane, with a hardness of 95–97 at Rubber Code Shore D Scale of JIS.

The rollers in the forming section 35 function as out-feed rollers and restrict the feeding speed of the electrode 41 by the rotational speed. As such, the in-feed roller 314 and the out-feed rollers in the forming section 35 enable to feed an electrode therebetween with the predetermined tension and feeding speed. The blade section 320 is located therebetween and is designed to rotate in the same direction as the electrode but approximately 0–3% faster.

In the forming section 35, adjacent slit electrode bands 41 are separated to be fed in the upper or lower direction. Distance between the upper and lower sections depends upon the relative distance among the slitting section 32, the first electrode cleaning section 33 and the forming section 35. Accordingly, the arrangement above improves operability of the adjacent slit electrode bands 41.

(e) Electrode Cleaning Section

The electrode cleaning sections 33, 34 are designed to remove the fragments 42 such as powder and foreign objects adhered on the slit electrode 41. For example, the first electrode cleaning section 33 is located after the slitting section 32 before the forming section 35, i.e., between the slitting section 32 and the forming section 35. The second electrode cleaning section 34 is appropriately positioned between the forming section 35 and the winding section 36. The fragments 42 are removed more accurately by including the first and second electrode cleaning sections 33, 34.

(f) First Electrode Cleaning Section

Figure 11:
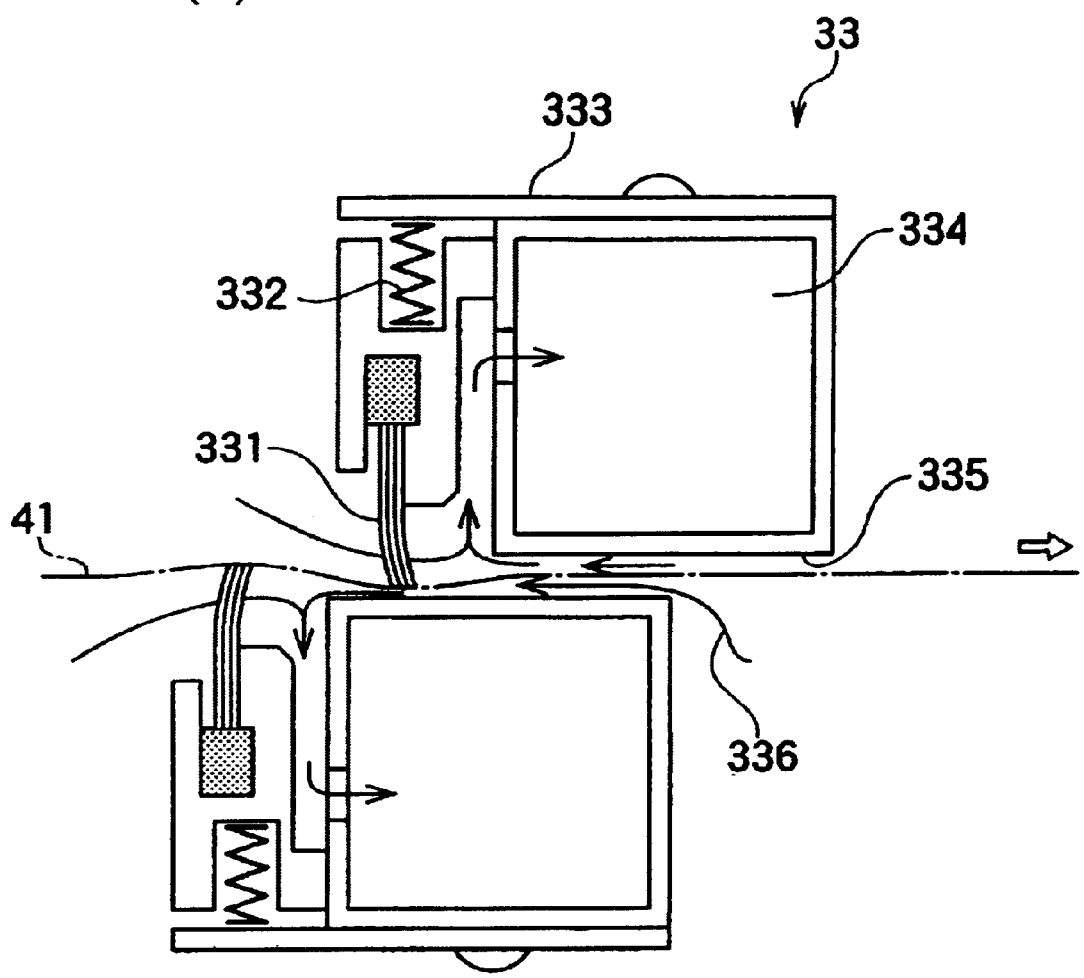
FIG. 11(A) is a drawing of the first electrode cleaning section.
FIG. 11(B) is a drawing of the brush removing fragments on end surfaces of the slit electrode.
Figure 11:
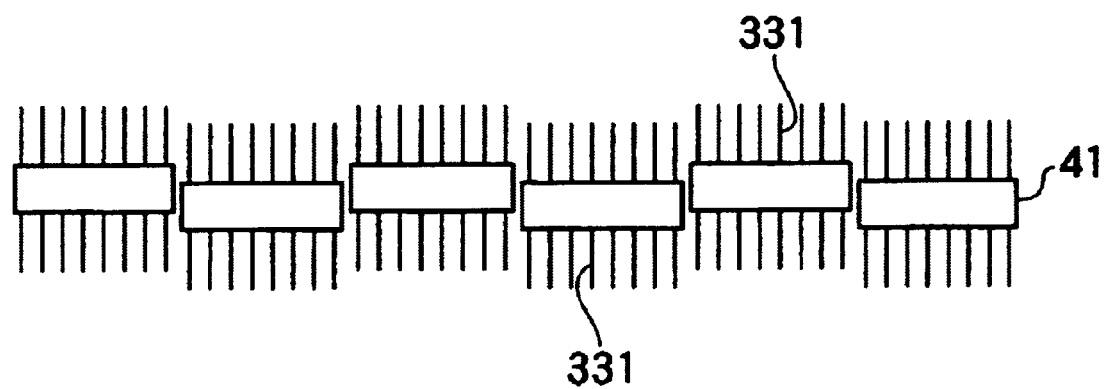

The first electrode cleaning section 33 mainly removes fragments created at slitting. If forming is conducted on an electrode while having fragments thereon, the fragments may be adhered and fixed on the electrode. The first electrode cleaning section 33 as shown in FIG. 11 uses brushes 331 and a suction device so as to remove the fragments. The brush 331 may be a wire brush made from plurality of stainless wires, and the plural brushes 331 are positioned in the width direction of the electrode or the crossing direction with the electrode feeding at predetermined intervals sufficient for the fragments to pass through. The brushes 331 are arranged not to make a straight line but rather to make a staggered line relative to the electrode feeding direction. The brush 331 abuts against the electrode 41 by a spring 332 so as to contact fragments on any portion of the electrode 41. The suction device makes airflow 336 between wires and suctions to catch the fragments on the electrode at a filter together with the brushes. As required, the first electrode cleaning section 33 may be provided at both sides of the electrode. In this case, the brushes 331, 331 on both sides of the electrode are arranged to indirectly face each other around a contact point with the electrode. The brushes 331 on one side come after the other side at the predetermined interval between the two in the feeding direction. Accordingly, the brush 331 efficiently contacts the surface of the electrode 41.

The first electrode cleaning section 33 is configured such that the brush 331 is installed on a holding member 333 via a spring 332. The electrode 41 is fed to contact with the brush 331 for removing the fragments and to carry the fragments into a transfer tube 334 by the airflow. Then, the fragments are collected by the filter and are gathered in a dust/fragment collection container. The transfer tube 334 for example may be an angular tube which may be positioned in the crossing direction relative to the electrode feeding direction. An airflow adjuster 335 is positioned at the electrode side of the transfer tube 334 so as to adjust a clearance with the electrode 41 into which a high airflow is supplied to efficiently carry the fragments. The clearance for example may be between the range of 1.5 mm–2 mm. A clearance between the pair of the first electrode cleaning section 33 at their airflow adjusters is in the range of 3 mm–4 mm.

As shown in FIG. 11(B), the adjacent slit electrodes 41 are orthogonally separated up and down relative to a pre-slit electrode surface, and a portion near the tip of brush 331 contacts an end surface of the electrode 41 such that the fragments on the end surface of the electrode may be efficiently removed. As such, in order to divide the electrode orthogonally up and down and to brush the end surface of the electrode, the distance between the upper electrode band and the lower electrode band is decided based on various conditions such as the shape of the electrode and location of the device. For example, the first electrode cleaning section 33 is positioned adjacent to the slitting section 32, and if the distance between the first electrode cleaning section 33 and the forming section 35 is between 200 mm–250 mm, the distance between upper and lower electrode bands at the forming section 35 is about 5 mm.

(g) Second Electrode Cleaning Section

Figure 12:
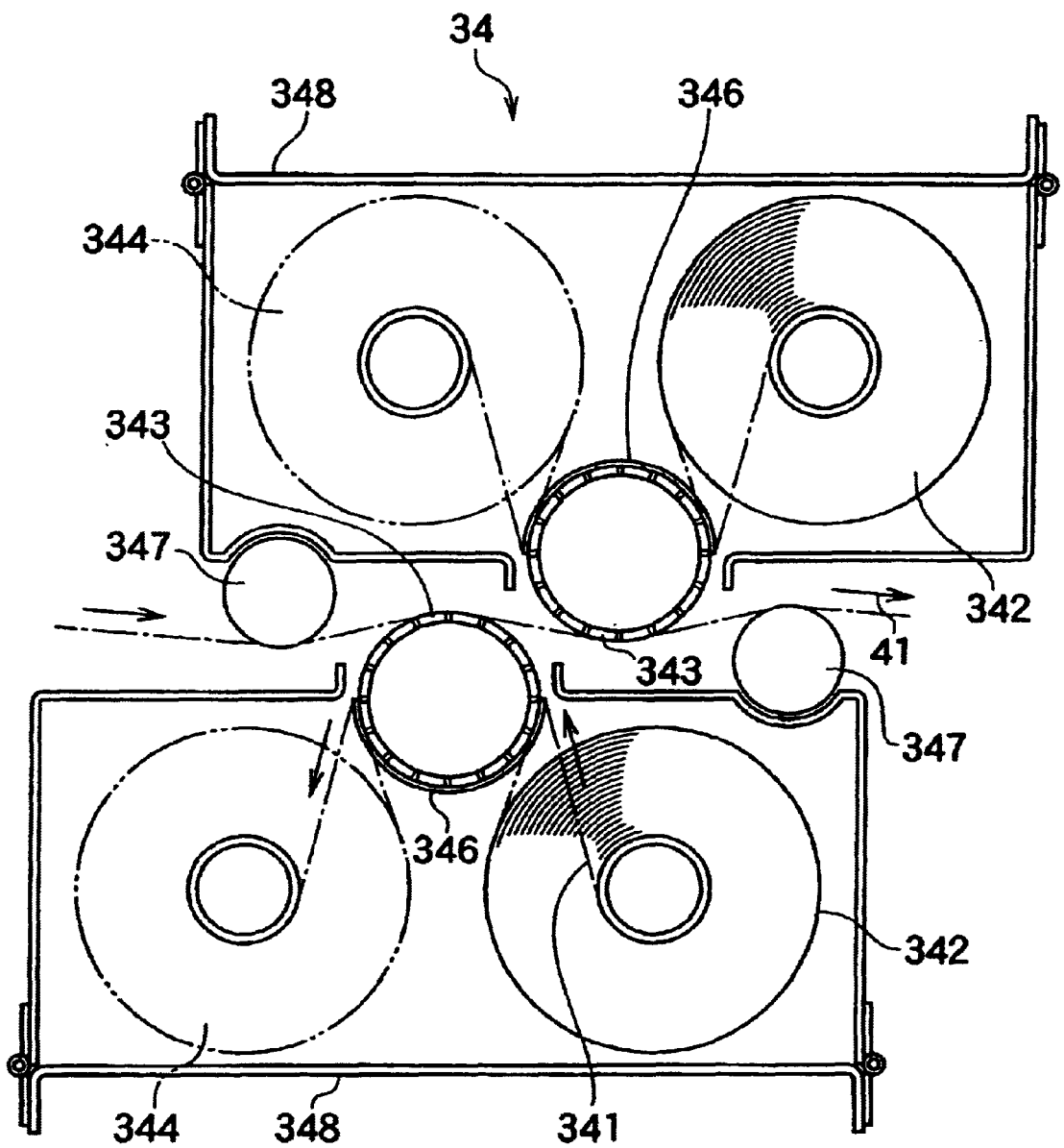
FIG. 12 is a drawing of the second electrode cleaning section.

The second electrode cleaning section 34 is to remove fragments mainly created at forming, and as shown in FIG. 12 the feeding roller 342 and the storing roller 344, on which the sheet roll 341 is rolled, an abutment roller 343, and a winding guide 347 are installed in a securing body 348. The second electrode cleaning section 34 uses the sheet roll 341 abutting against the surface of the electrode 41. The sheet roll 341 for example may have a plurality of holes through which articles such as non-woven fabric and woven fabric passes. The sheet roll 341 is formed by an electrode band rolled on the feeding roller 342 and then feeding the electrode band from the feeding roller 342 so that it is rolled on the storing roller 344 via the abutment roller 343 abutting against the electrode 41. The slit electrode 41 is inserted between and abuts against the winding guide 347 and the abutment roller 343 to be fed. The sheet roll 341 contacts the electrode 41 at the abutment roller 343 to remove the fragments from the electrode 41. The electrode cleaning section 34 has a suction device to provide suction to the inside of the abutment roller 343 as required. Plural holes are formed on the circumferential surface of the abutment roller 343, and the fragments are effectively removed by suction of the outside air from the holes. A suction pipe may be used as the abutment roller 343 having holes on its circumferential surface. The holes on the abutment roller are arranged to comply with the width of the electrode. Rotation of the abutment roller, i.e., driving and braking, is controlled by a motor so as to determine the feeding speed of the sheet roll 341.

A front half on the circumferential surface of the abutment roller/pipe 343 contacts the sheet roll 341 and a back half of the abutment roller/pipe 343 is covered by a suction plate 346. Accordingly, suction is conducted only at a portion where the electrode 41 and the sheet roll 341 are pressed to contact each other. The suction plate 346 does not rotate and only the abutment roller/pipe 343 rotates. If the feeding direction of the sheet roll 341 is opposite to that of electrode 41, a relative speed of the electrode 41 and the sheet roll 341 becomes larger and more sheet roll surface contacts with the electrode. As a result, the fragments on the electrode can easily be transferred to the sheet roll 341. When the suction device sucks inside of the abutment roller, the fragments on the electrode and the sheet roll may be suctioned and removed together with the movement of the sheet roll 341 and filtered to be gathered in the duct/fragment collection container. As required, the second electrode cleaning section 34 may be provided at both sides of the electrode. In this case, the abutment rollers 343 at both sides of the electrode 41 are arranged to face each other around the contact point with the electrode but are not directly facing each other with the predetermined interval between the two brush lines in the feeding direction. Accordingly, a contact point between the sheet roll 341 and the electrode 41 becomes larger/longer, thereby improving the fragment removal effect. The contacting length for example may be about 10 mm. This contacting length may be decided according to conditions such as the size of the device and thickness of the abutment roller. However, unnecessarily long contacting length prevents from uniformly maintaining the tension of every slit electrode, thereby providing a possibility of breaking or slitting the electrode off.

Figure 13:
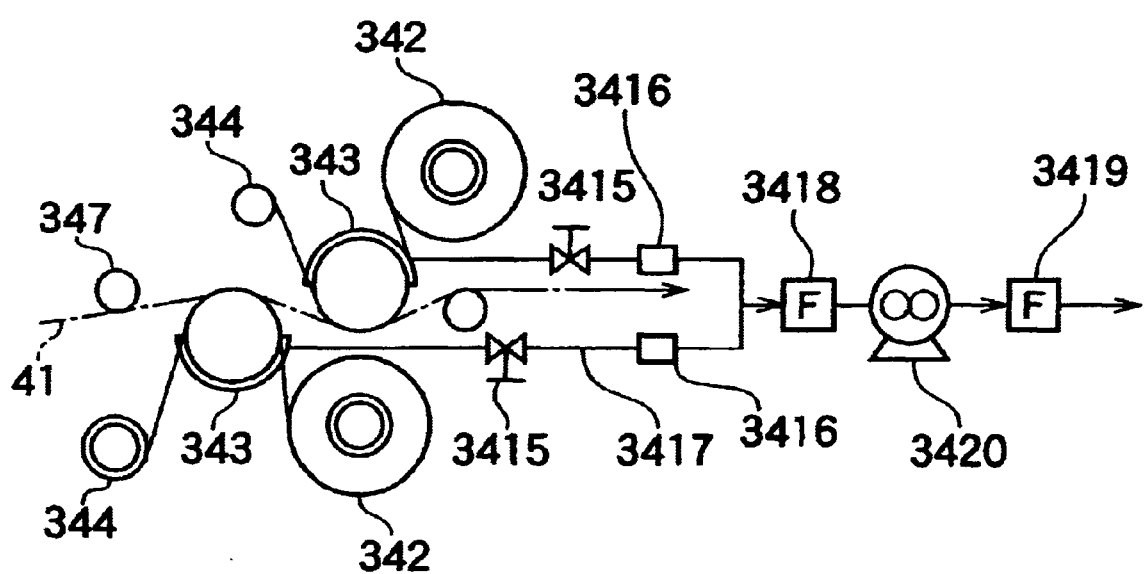
FIG. 13 is a drawing explaining suction in the second electrode cleaning section.

As shown in FIG. 13, the abutment roller/pipe 343 is connected to the suction device 3420 via a piping. For example, the piping is connected to a valve 3415, a flowmeter 3416, a dust/fragment collection filter 3418, a suction device 3420 and a high performance filter 3419. The valve 3415 is to adjust the amount of suction to the pair of second electrode cleaning sections 34. The flowmeter 3426 is utilized to measure and adjust the amount of suction. The duct/fragment filter 3418 is designed to collect the fragments removed and alarms when stopped up. The collected fragments are gathered in the dust/fragment collection container. The suction device 3420 for example may be a multistage high static pressure blower. The high performance filter 3419 has an alarm unit, which indicates when the filter leaks. A gas suction system such as the piping, the valve 3415, the flowmeter 3416, the dust/fragment collection filter 3418, the suction device 3420, the high performance filter 3419 and the suction device 3420 may be used at the blade cleaning section 327 and the first electrode cleaning section 33.

Figure 14:
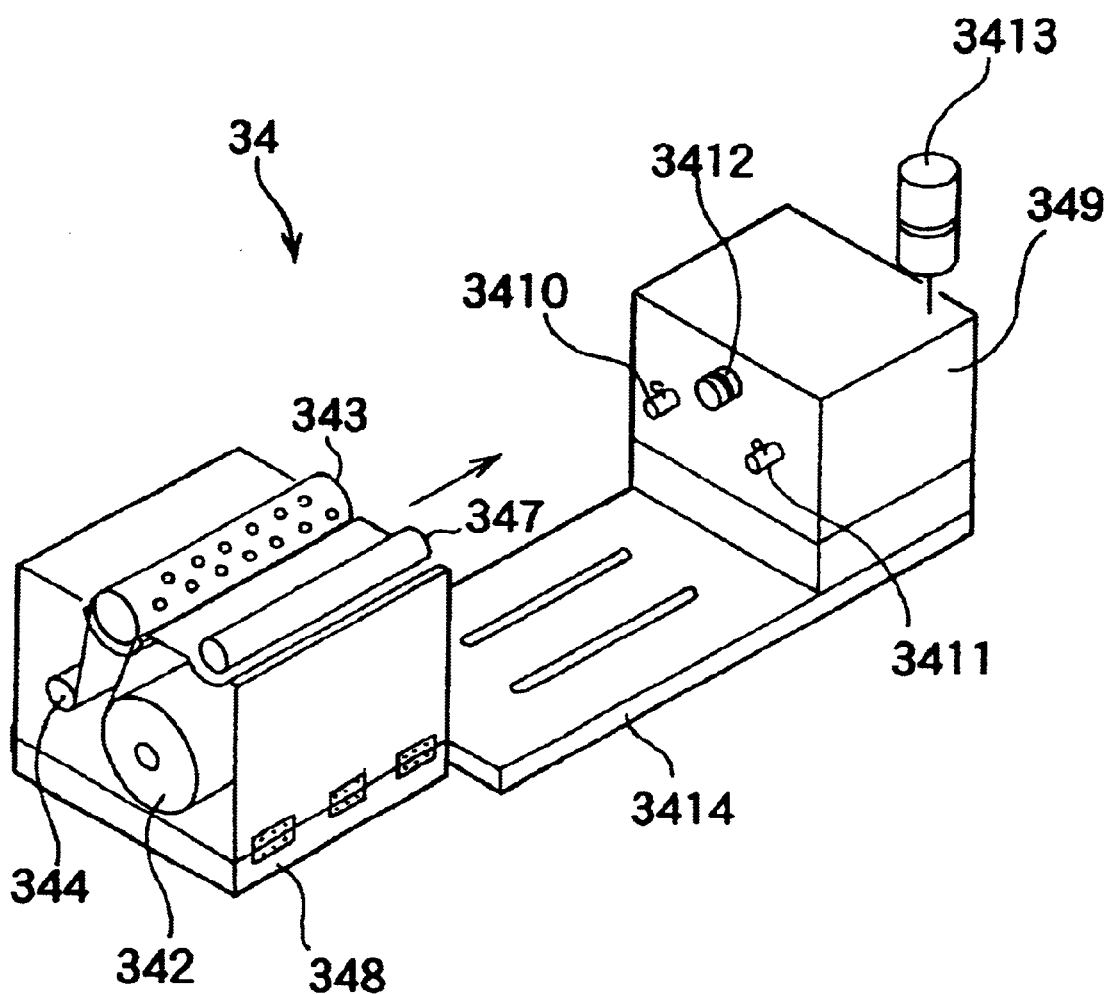
FIG. 14 is a drawing of the drive part of the second electrode cleaning section.

The securing body 348 for as shown in FIG. 14 may be removably assembled with the drive section 349 along the slide rail 3414. The feeding roller 342 is mounted on the securing body 348. The storing roller 344 and the abutment roller 343 are connected to joints so as to rotate and slide in the predetermined direction by the motor/driving device of the drive section 349 and the brake/slide device. For example, the feeding roller 342, the storing roller 344, and the abutment roller 44 are connected to the unwinding power brake joint 3411, the winding torque motor joint 3410 and the motor/brake joint 341, thereby generating a rotational fore and conducting slide control. A sensor 3412 moves the second electrode cleaning section 34 to abut against or away from the electrode 41. As such, the second electrode cleaning section 34 may be moved and the securing body 348 may be detached from the drive section 349, thereby facilitating maintenance of the second electrode cleaning section 34 and exchange of the sheet roll 341.

(h) Winding Section

The winding section is to hold the slit electrode 41. The winding section for example is winding cores 361 including plural reels and cores, and the narrowly slit electrode bands 41 are to be wound thereon. A stopper pad 47 and a tension detector 45 are positioned in front of the winding core 361. The stopper pad 47 is to temporarily hold and stop the slit electrode band 41. The tension detector 45 is to measure the electrode tension between the forming section 35 and the winding core 361.

An example of slitter operation will be described below with reference to FIG. 5.

(a) Initial Setting

A predetermined setting is to be made prior to the slitter operation. As an example of negative electrode, the setting needs to be made as to a tailoring speed of e.g., 20M/min., a blade slip ratio of about 1% added to the electrode feeding speed, a provisional winding tension, a slit length of 500 m, a speed curve at rise time, an automatic stop curve, an automatic on/off function for the second electrode cleaning section, pressure at the forming section, a unwinding tension, slitting tension, a non-woven fabric feeding speed at the second electrode cleaning section, and a timing of stall tension preventing the non-woven fabric sagging prior to the operation.

The remaining electrode raw material sheet and the remaining non-woven fabric as to the length are to be displayed on the operation control panel, so that the operation does not automatically stop for lack of electrode raw material sheet and non-woven fabric. In addition, it is designed that the operation does not stop if the dust/fragment collection container is full of fragments.

(b) Feeding the Electrode Into the Slitter

First, the electrode raw material sheet 4 is slowly fed from the unwinding core 311 of the unwinding section and is slit into the predetermined width at the slitting section 32. Then, the slit electrode bands 41 are taped and fixed on the winding core 361 of the winding section 36 to be stall-tensioned to hold the same prior to the operation.

(c) Slitter Operation

Operation of the slitter 3 starts by automatically applying the stall tension. One of the pair of second electrode cleaning sections 34, for example the lower second electrode cleaning section 34, is lifted, and the winding tension is applied to prevent sagging of the non-woven fabric. Then, the suction device 3420 is turned on. The feeding speed of the electrode band 41 gradually increases at the initial stage until a constant speed, then is tailored and decelerates at the end. Specifically, the electrode raw material sheet 4 is unwound from the unwinding core 311 by the in-feed roller 314. The unwound electrode raw material sheet 4 is guided to the respective guide roller 46 and is transferred to the slitting section 32 via the temporary fixing section 312, the observation section 313, and the respective tension detection section 45. The observation section 313 observes the feeding condition of the electrode. A back end of the electrode raw material sheet and a front end of the next electrode raw material sheet are connected to make a flat surface at the temporary fixing section 312.

The tension and feeding speed of the electrode is restricted by the in feed roller 314 and the roller of the forming section 35. Feeding of the electrode raw material sheet starts from 0 and increases by 20/mm. to reach the maximum speed. Then, the feeding speed is held as the constant speed and the electrode raw material sheet is constantly slit while feeding. The feeding is automatically slowed down to pause, and the electrode 41 while a stall tension being applied is held by the stopper pad 47 Here, since the electrode raw material sheet 4 wound around the unwinding core 311 is rather heavy, it must be carefully controlled so as not to be sagged or slit off. Therefore, tension detector 45 positioned between the temporary fixing section 312 and the observation section 313 detects the tension of the electrode raw material sheet 4 and applies the feed back to adjust the tension so as to unwind.

The electrode raw material sheet 4 is slit at the slitting section 32, and the adjacent slit electrode bands 41 are divided into upper and lower electrode bands passing through the first electrode cleaning section 33, the forming section 35, the second electrode cleaning section 34, and the tension detector 45, the stopper pad 46 so as to be wound around the winding core 361. The fragments created at the slitting are sucked an removed by the blade cleaner 372, and the fragments 42 on the electrode is sucked and removed by the first electrode cleaning section 33. The convex portion 17 created at slitting is formed by press at the forming section 35, and the fragments 42 adhered on the electrode is sucked and removed by the second cleaning section 34. If the feeding of the electrode 41 is paused, the electrode 41 is held by the stopper pad 47 to be fixed. While holding the electrode 41 by the stopper pad 47, winding operation may be freely conducted manually. The end of the electrode band may be taped, and the reel with the wound electrode band may be removed. Then, a new empty reel may be prepared. When finishing the operation of the slitter 3, the suction device 3420 of the second electrode cleaning section is turned off. Feeding of the sheet roll 341 is paused, and the lower second electrode cleaning section may be lowered. Since the electrode 41 as slit accordingly has the convex portion 17, the electrode band 41 is wound evenly around the winding core without irregular winding.

In the following, description will be given for a method of manufacturing electrode material, to which an ion conductive polymer is adhered.

(a) Method for Manufacturing Electrode Structures

To manufacture the electrode structures, an ion conductive polymer or ion conductive polymer raw material or a mixture of these, i.e. the material for forming ion conductive polymer, is attached in with a very thin thickness to the surface of an electrode material. Then, a solvent is added to turn it into a liquid and a paste-like state. This is then coated on a current collective member and is dried to evaporate the solvent. Alternatively, the solvent may be added from the beginning, and it may be turned into a paste-like state at the same time as it is adhered to the ion conductive polymer forming material.

In this case, only a slight quantity of the ion conductive polymer forming material is used. The surfaces of particles of the powdery electrode material are adhered with ion conductive polymer so that there will be no void, and that gaps between powder particles will be minimized.

To adhere the ion conductive polymer forming material with powdery electrode material, the ion conductive polymer forming material and the powdery electrode material are pressurized and ground against each other, and a pressurized product is obtained.

(b) Pressurizing and Grinding

Pressurizing and grinding is defined as an operation to grind a mixture of the ion conductive polymer forming material and the powdery electrode material against each other while pressurizing. An external force is applied to the mixtures so that they cohere to each other and the particles rotate. This process is performed repeatedly to obtain a press-sliding product.

(c) Pressurizing, Grinding and Kneading Device

Figure 15:
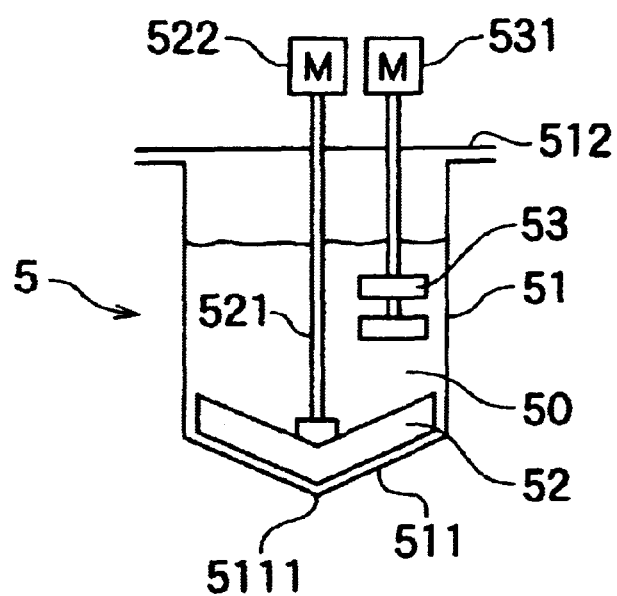
FIG. 15(A) is a drawing explaining the press-sliding and kneading device.
FIG. 15(B) is a drawing explaining the main blade of the press-sliding and kneading device.
FIG. 15(C) is a cross-section view of the main blade.
FIG. 15(D) is a cross-section view of another type of main blade.
Figure 15:
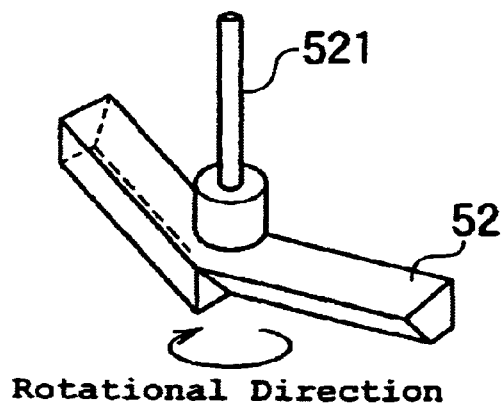
Figure 15:
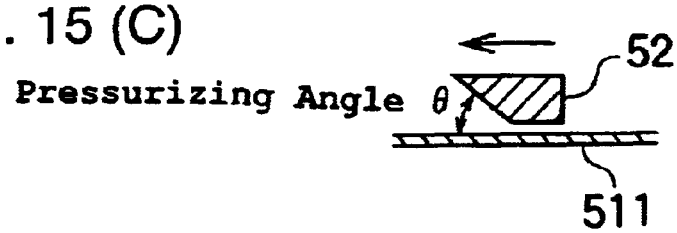
Figure 15:
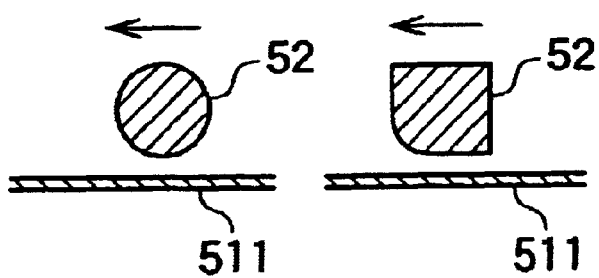
Figure 16:
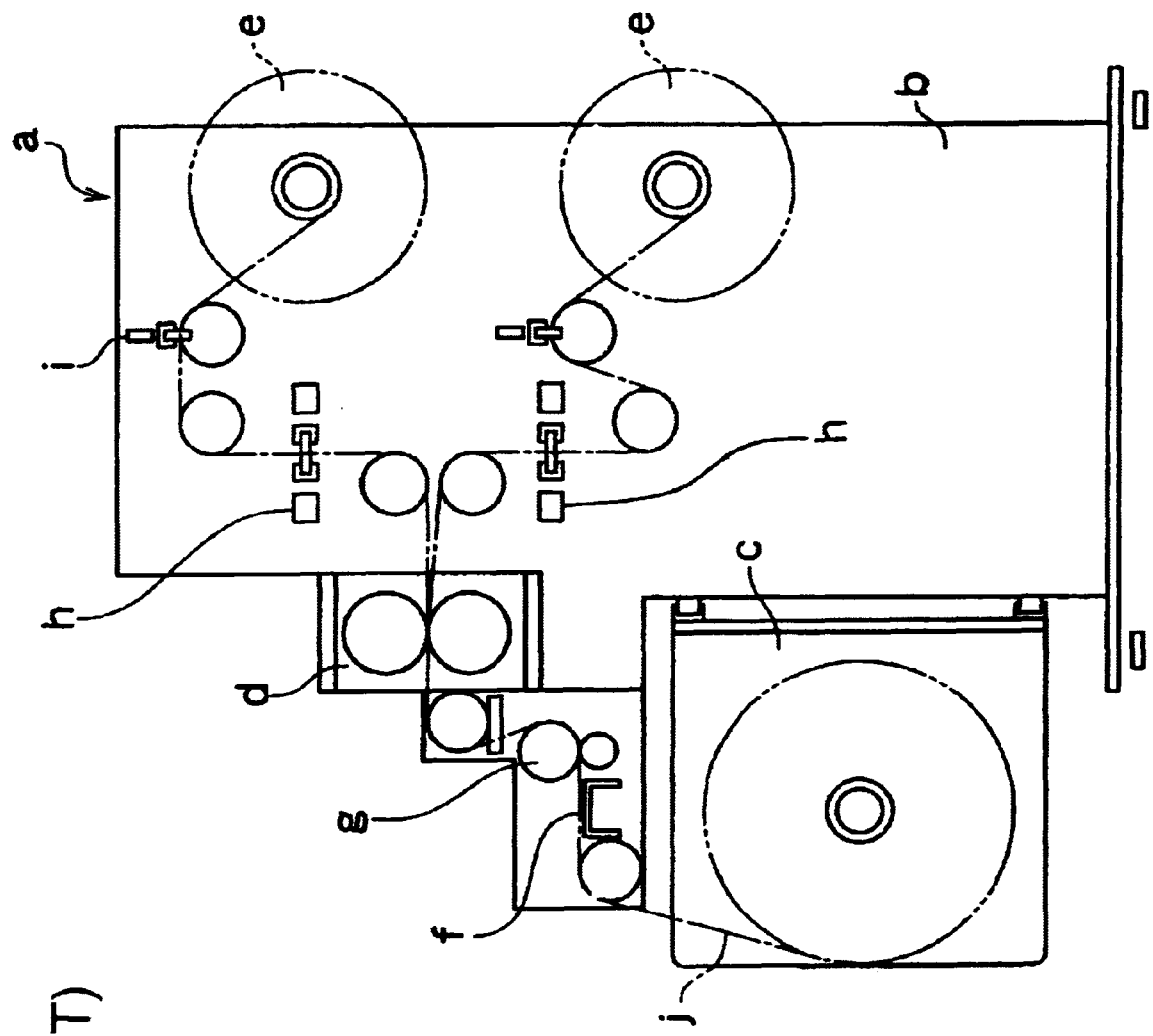
FIG. 16 is a drawing of a conventional slitter structure.

A pressurizing, grinding and kneading device 5 is shown in FIG. 15. The mixture 50 of the ion conductive polymer forming material and the powdery electrode material 13, or a mixture 50 containing this mixture and solvent, is placed in a container 51, and a main blade 52 is rotated by the main motor 522. There is a gap between a bottom 511 of the container 51 and the main blade 52. When the main blade 52 is rotated, a part of the mixture 50 is moved between the bottom 511 of the container and the main blade 52. It is subject to press-sliding and kneading. This procedure is repeated, and the ion conductive polymer forming material is adhered to the powdery electrode material 13. The bottom 511 of the container 21 may be flat or inclined, and the facing surface area between the main blade 52 and the bottom 511 is preferably large to increase the effectiveness of press-sliding.

In the pressurizing, grinding and kneading device 5, a dispersing blade 531 is provided in the container 51. A sub-motor 531 rotates the dispersing blade 53 at high speed, and the mixture 50 pressurized and slided is dispersed.

(d) Container

The container 51 is provided for holding the mixture 50 which is press-slided and stirred. At the bottom of the container 51, there is provided a lower portion 5111. The bottom surface 511 is inclined upward as it goes toward the peripheral portion. For instance, it is lower at the center, and it gradually goes up toward the periphery. It is formed in the bottom 511 in the shape of a conical mortar. The inclination angle of the lower portion 5111 is set to 120° C., for example. The bottom 511 of the container 51 has wear resistant property. For example, it can be made of SUSand formed by spraying tungsten or carbide. Plural bottom parts of this type may also be formed on the bottom surface 511. And the inclination angle of the bottom 511 may vary depending on the operator requirements.

(e) Main Blade

The main blade 52 functions together with the bottom surface 511 of the container 51, serving to press-slide and stir the mixture 10. The main blade 52, is positioned via shaft 521 to the desired location relative to the bottom 5111 of the container 51 as shown in FIGS. 15(A) and (B). The main blade 52 curves upwards corresponding to the slant of the bottom 511 of the container 51. The main blade 52 may comprise two blades attached from the center part as shown in FIG. 15(B), or it may comprise a larger number of blades, e.g. 10 or more, depending on the amount and type of mixture.

The number of rotations of a main motor 522 driving the main shaft 521 is set low for example to 120 rpm or less, when press-sliding is performed.

The gap between the bottom surface 511 of the container 51 and the base surface of the main blade 52 is set as narrow as is necessary for press-sliding the mixture, for example 15 mm or less. This distance depends on a number of factors including the capacity of the press-sliding mixer 5 and the shape of the main blade.

The surface in the motion direction (press-sliding direction) of the main blade 52 is formed so that a pressing angle $\theta$ relative to the bottom surface 511 of the container 51 is an acute angle. For example, if the cross-section of the main blade 52 is a reverse trapezoid as shown in FIG. 15(C), the pressing angle is between 3 degrees and 70 degrees. The cross-section of the main blade 52 may also be circular or have a rounded corner as shown in FIG. 15(D). The material of the main blade has wear-resistant properties, and is formed for example by thermal spraying with tungsten or carbide using SUS.

The surface of the main blade 52 opposite to the advancing direction (direction of pressurizing and sliding) is designed in such manner that it runs almost perpendicular to the bottom surface and at an acute angle. As a result, when the main shaft 521 is rotated in the reverse direction, the mixture 50 can be collected on the periphery of the main shaft 521.

If there are plural bottom parts on the bottom surface 511, the center parts of the main blade 52 are also disposed in positions of the bottom part corresponding to their number.

(f) Dispersing Blade

The dispersion blade 53 disperses the mixture 50 which is press-slid by the main blade 52. The dispersion blade 53 is disposed in a position at which the mixture 50 can be dispersed, and it rotates at a high speed such as 1000–4000 rpm by the sub-motor 531. By rotating it at high speed, the ion conductive polymer 16 or its raw material adhered on the surface of the particles of the powdery electrode material 13 are evenly dispersed over the entire powdery material.

In the following, a method for manufacturing the electrode raw material sheet is described:

(a) Example 1 for Manufacturing an Electrode Raw Material Sheet (Example for Manufacturing a Positive Electrode Structure)

Into a pressurizing, grinding, and kneading device, 9.1 weight parts of $LiCoO_2$ with average particle size of 5 μm, i.e. powdery electrode active material, and 0.6 weight part of graphite powder with average particle size of 4 μm, i.e. powdery conductive material, are placed; the mixture is pressurized and ground for 20 minutes. Then, 0.546 weight part of an ion conductive polymer raw material (A1) and 3.5 weight parts of acetonitrile are added. The ion conductive polymer raw material (A1) is a mixture, and its composition and mixing ratio are as shown in Table 1.

TABLE 1

Ion-conducting polymer raw material (A1)

| Substance | Mixing ratio (weight parts) |
|---|---|
| Difunctional (propylene glycol/ethylene glycol) random copolymer, SANNIX FA-103 (PO/EO = 2/8, Mw = 3,282, Sanyo Chemical Industries, Ltd.) | 8.36 |
| Difunctional 1,4-butanediol | 0.34 |
| Ethylene cyanohydrin | 1.27 |
| Reaction catalyst NC-IM (Sankyo Air Products K.K.) | 0.03 |
| Total | 10 |

The pressurized product added with the ion conductive polymer raw material (A1) is pressurized and ground for 5 hours in the pressurizing, grinding and kneading device. The pressurized product turns to a paste-like state. To the pressurized product, 0.254 weight part of polymeric MDI (MR-220; manufactured by NPU) is added, and the mixture is agitated for 5 minutes in the pressurizing, grinding and kneading device. The pressurized product is removed and placed on an aluminum foil of 20 μm in thickness and cast using a doctor knife applicator with gap of 100 μm. This is left to stand at room temperature for 15 minutes and then heated at 80° C. for 1 hours. The positive electrode structure thus prepared had a thickness of 80 μm.

(b) Example 2 for Manufacturing an Electrode Raw Material Sheet (Example for Manufacturing a Negative Electrode Structure)

Into a pressurizing, grinding and kneading device (volume capacity: 300 cc), 9.1 weight parts of graphite powder with average particle size of 5 μm, i.e. powdery electrode active material, 0.682 weight part of ion conductive polymer raw material (A1), and 3.0 weight parts of acetonitrile are placed, and the mixture was pressurized and ground for 7 hours. The pressurized product is turned to a paste-like state. Then, 0.318 weight part of polymeric MDI (MR-200; manufactured by NPU) is added, and the mixture pressurized and ground for 5 minutes. The pressurized product is removed and placed on a copper foil with a thickness of 20 μm and cast using a doctor knife applicator with gap of 100 μm. This is left to stand at room temperature for 15 minutes and then heated at 80° C. for 1 hours. The electrode thus obtained had thickness of 80 μm.

(c) Example 3 for Manufacturing an Electrode Raw Material Sheet (Example for Manufacturing an Electrode Structure for a Capacitor)

To prepare an electrode for capacitor, 1.03 weight part of carbon black is added as the powdery conductive material to 9.02 weight part of phenol derived activated carbon (manufactured by Kansai Chemical Co., Ltd.) as the electrode material. This is then processed by dry mixing in a mixer. Then, 0.48 weight part of polymer A1 is added as a binder and is mixed. Further, 5.6 weight part of acetonitrile as a solvent is added and mixed. After mixing, the material is coated onto the collector element with a doctor knife applicator. The samples are then heated by infrared radiation or by heated air. The thickness of the electrode thus prepared is 75 μm.

The details of the procedure for manufacturing the electrode structures as described above are described in patent applications filed by the inventors of the present invention (Japanese Patent Applications 11-262501, 11-262502, 11-2691124, and 2000-38744). In addition, the ion-conducting polymer coated on the electrode material layer is not limited as described above, alternate embodiments may be utilized and remain within the scope of the present invention.

(d) Example 4 of Electrode Raw Material Sheet (Coating of the Coating Material for Forming Ion Conductive Polymer Layer on Positive Electrode Structure of the Battery)

One weight part of cyanoethylated dihydroxypropyl cellulose and lithium perchlorate are dissolved in tetrahydrofurane. This solution is left to stand under reduced pressure to evaporate the tetrahydrofurane. Then, 0.2 weight part of polyethylene glycol dimethacrylate (oxyethylene unit number=9) and 0.2 weight part of methoxypolyethylene glycol monomethacrylate (oxyethylene unit number=9) are added. Further, 0.002 weight part of azobisisobutyronitrile is added so that lithium perchlorate is 1 mol per 1 kg of total weight containing all components. The complex product thus prepared is a viscous solution. Cyanoethylated dihydroxypropyl cellulose as described above is disclosed in JP-A-8-225626. The materials are described in: Macromolecules, 24, 4691 (1991) and Makromol. Chem. 193, 647 (1992).

Specifically, the components are added so that lithium perchlorate is 1 mol per 1 kg of the total weight of the mixture of lithium perchlorate+cyanoethylated dihydroxypropyl cellulose+polyethylene glycol dimethacrylate+methoxypolyethylene glycol monomethacrylate+azobisisobutyronitrile. Thus, the coating material 22 for forming the ion conductive polymer layer of the complex product of polymer electrolyte–lithium perchlorate is prepared.

The coating material 22 for forming the ion conductive polymer layer of the polymer electrolyte–lithium perchlorate complex product thus prepared is cast on a positive electrode structure (the electrode structure 1 prepared by coating the positive electrode material on the current collector) using a doctor knife applicator. It is left to stand at 80° C. for 0.5 hour, and an ion conductive solid macromolecular electrolyte film layer in semi-solid state (ion conductive polymer layer 2) is prepared.

(e) Example 5 of Electrode Raw Material Sheet (Coating of the Coating Material for Forming Ion Conductive Polymer Layer on Negative Electrode Structure of the Battery)

On the negative electrode structure, the complex product of polymer electrolyte–lithium perchlorate (coating material 22 for forming ion conductive polymer layer) prepared in Example 4 is cast using a doctor knife applicator. This is left to stand at 80° C. for 0.5 hour, and ion conductive solid macromolecular electrolyte film layer (ion conductive polymer layer 2) is formed, and a negative electrode structure with the ion conductive polymer layer 2 is prepared. Then, the same procedure as in Example 1 is performed except that the negative electrode structure is used.

In addition, the details of the above-procedure for obtaining the ion-conducting polymer layer may be referred to in the following patent applications, the Japanese Patent Application No. 2000-141687, filed by the applicants of the present invention.

(f) Example 6 for Manufacturing an Electrode Raw Material Sheet (Electrode for a Lithium-ion Battery Utilizing Polyvinylidene Vinylidene as a Binder)

Regarding the preparation of the positive electrode, for example the lithium carbonate and cobalt carbonate is mixed at the ratio of 0.5 mol–0.5 mol and baked at a temperature of 900° C. for 5 hours in order to obtain the positive active material. Then, the obtained 91 weight part of $L_iCoO_2$, 6 weight part of graphite as a conductive material and 10 weight part of polyvinylidene vinylidene as a binder are mixed to prepare the negative mixture. This mixture is dispersed in N-methyl-2-pyrrolidinone-to be slurried. The obtained slurry is evenly applied on one side of an aluminum foil with a thickness between 20 $\mu$m and 100 $\mu$m. After drying, an adhesion device is used to conduct press form thereon.

In comparison, a negative electrode, 90 weight part of the grinded graphite and 10 weight part of polyvinylidene vinylidene as a binder is mixed to prepare a negative mixture, and the mixture is dispersed in N-methyl-2-pyrrolidinone-to be slurried. This slurry is evenly applied on one side of the copper foil, as a current collective member, 10 $\mu$m thick, and after drying an adhesion device is used to conduct press form thereon.

This invention as described above, renders the advantages of providing an electrode with an excellent quality for an electrical component, an electrical component with less possibility of defects, and a slitter with an excellent accessibility.

It is readily apparent that the above described invention has the advantages of wide commercial utility. It may be understood that the specific form of the invention hereinabove described is intended to be representative only, and certain modifications within the scope of those teachings will be apparent to those skilled in the art without departing from the spirit and scope of the invention.

Accordingly, reference should be made to the following claims in determining the full scope of the invention.

What we claim is:

1. A slitter for an electrode raw material sheet comprising an unwinding section to supply said electrode raw material sheet, a slitting section having a slitter for said electrode raw material sheet, a forming section to reshape/smooth a convex portion on a slit electrode portion of said electrode raw material sheet, an electrode cleaning section to clean fragments adhered on said electrode raw material sheet, and a winding section to wind said slit electrode portion.

2. The slitter for an electrode raw material sheet according to claim 1, wherein the electrode cleaning section employs a blade cleaning section to remove a number of fragments via an air flow.

3. The slitter for an electrode raw material sheet according to claim 1, the slitter further comprising a first electrode cleaning section to remove a number of fragments adhered on said electrode raw material sheet between the slitting section and the forming section.

4. The slitter for an electrode raw material sheet according to claim 3, wherein the first electrode cleaning section comprises a brush to contact said number of fragments and a suction device for removing said number of fragments.

5. The slitter for an electrode raw material sheet according to claim 4, wherein the first electrode cleaning section has a pair of brushes indirectly facing each other, a first brush of said pair of brushes is positioned after the a second brush of said pair brushes in an electrode feeding direction.

6. The slitter for an electrode raw material sheet according to claim 4, wherein an adjacent pair of slit electrodes are orthogonally separated up and down relative to a pre-slit electrode surface.

7. The slitter for an electrode raw material sheet according to claim 1, wherein the electrode cleaning section has a slit electrode cleaning section to remove a number of fragments adhered on the electrode raw material sheet between the forming section and the winding section.

8. The slitter for an electrode raw material sheet according to claim 1, wherein the electrode cleaning section has a first slit electrode cleaning section to remove a number of fragments adhered on the electrode raw material sheet between the forming section and the winding section, and a second electrode cleaning section comprises a sheet roll to contact the fragments to remove a number of fragments.

9. The slitter for an electrode raw material sheet according to claim 1, wherein the electrode cleaning section has a first slit electrode cleaning section to remove a number of fragments adhered on the electrode raw material sheet between the forming section and the winding section, and a second electrode cleaning section includes a sheet roll to contact said number of fragments and a suction device to remove said number of fragments.

10. The slitter for an electrode raw material sheet according to claim 1, wherein the electrode cleaning section has a slit electrode cleaning section to remove a number of fragments adhered on the electrode raw material sheet between the forming section and the winding section, a second electrode cleaning section includes a sheet roll to contact the number of fragments to remove the same, and the sheet roll of the second electrode cleaning section is fed by a roller to be pressed against the electrode raw material sheet.

11. The slitter for an electrode raw material sheet according to claim 1, wherein the electrode cleaning section has a slit electrode cleaning section to remove a number of fragments adhered on the electrode raw material sheet between the forming section and the winding section, a second electrode cleaning section includes a sheet roll to contact the number of fragments to remove the same, the sheet roll of the second electrode cleaning section is fed by a first and second rollers to be pressed against the electrode raw material sheet, and the first and second rollers are positioned to face each other so that said second roller is positioned after said first roller in an electrode feeding direction.

12. The slitter for an electrode raw material sheet according to claim 10, wherein the electrode cleaning section has the slit electrode cleaning section to remove said number of fragments adhered on the electrode raw material sheet between the forming section and the winding section, the second electrode cleaning section includes a sheet roll to contact the number of fragments to remove the same, the sheet roll of the second electrode cleaning section is fed by a roller to be pressed against the electrode, and the roller has a plurality of vents on a circumferential surface from which suction is conducted by a suction device.

13. The slitter for an electrode raw material sheet according to claim 1, wherein the electrode cleaning section has a slit electrode cleaning section to remove a number of fragments adhered on the electrode raw material sheet between the forming section and the winding section, a second electrode cleaning section includes a sheet roll to contact the number of fragments to remove the same, and the sheet roll having a plurality of vents wherein the sheet roll is a non-woven fabric.

14. The slitter for an electrode raw material sheet according to claim 1, wherein the electrode cleaning section has a slit electrode cleaning section to remove a number of fragments adhered on the electrode raw material sheet between the forming section and the winding section, a second electrode cleaning section includes a sheet roll to contact the number of fragments and a suction device to remove the number of fragments, and the sheet roll having a plurality of vents wherein the sheet roll is a non-woven fabric.

15. The slitter for an electrode raw material sheet according to claim 1, wherein the forming section has a pair of rollers between which the electrode raw material sheet is fed to conduct smoothing on the convex portion of the slit electrode.

16. The slitter for an electrode raw material sheet according to claim 1, wherein said unwinding section, said slitting section, and said winding section are separately positioned in separate units.

* * * * *

UNITED STATES PATENT AND TRADEMARK OFFICE
CERTIFICATE OF CORRECTION

PATENT NO.    : 6,634,270 B2
DATED         : October 21, 2003
INVENTOR(S)   : Takaya Sato and Tatsuo Shimizu It is certified that error appears in the above-identified patent and that said Letters Patent is hereby corrected as shown below:

<u>Title page,</u>
Item [73], Assignees, should read -- Nisshinbo Industries, Inc. Tokyo, Japan and Itochu Corporation, Osaka, Japan --

Signed and Sealed this

Twentieth Day of July, 2004

JON W. DUDAS
*Acting Director of the United States Patent and Trademark Office*